(12) United States Patent
Davis

(10) Patent No.: US 8,913,321 B2
(45) Date of Patent: Dec. 16, 2014

(54) FINE PITCH GRID POLARIZER

(71) Applicant: Moxtek, Inc., Orem, UT (US)

(72) Inventor: Mark Alan Davis, Springville, CA (US)

(73) Assignee: Moxtek, Inc., Orem, UT (US)

( * ) Notice: Subject to any disclaimer, the term of this patent is extended or adjusted under 35 U.S.C. 154(b) by 243 days.

(21) Appl. No.: 13/628,909

(22) Filed: Sep. 27, 2012

(65) Prior Publication Data

US 2013/0258471 A1 Oct. 3, 2013

Related U.S. Application Data

(63) Continuation-in-part of application No. 13/224,719, filed on Sep. 2, 2011, now Pat. No. 8,611,007.

(60) Provisional application No. 61/384,796, filed on Sep. 21, 2010, provisional application No. 61/384,802, filed on Sep. 21, 2010.

(51) Int. Cl.
*G02B 5/30* (2006.01)
*B82Y 20/00* (2011.01)

(52) U.S. Cl.
CPC ............... *G02B 5/3058* (2013.01); *B82Y 20/00* (2013.01)
USPC ................................ 359/485.05; 359/487.03

(58) Field of Classification Search
CPC ................... G02B 5/3058; G02F 2001/133548
USPC ........................................ 359/485.05, 487.03
See application file for complete search history.

(56) References Cited

U.S. PATENT DOCUMENTS

| | | | |
|---|---|---|---|
| 2,224,214 A | 12/1940 | Brown |
| 2,237,567 A | 4/1941 | Land |
| 2,287,598 A | 6/1942 | Brown |
| 2,391,451 A | 12/1945 | Fischer |
| 2,403,731 A | 7/1946 | MacNeille |
| 2,605,352 A | 7/1952 | Fishcer |
| 2,748,659 A | 6/1956 | Geffcken et al. |
| 2,813,146 A | 11/1957 | Glenn |
| 2,815,452 A | 12/1957 | Mertz |

(Continued)

FOREIGN PATENT DOCUMENTS

| | | |
|---|---|---|
| AU | 2003267964 | 12/2003 |
| CH | 0296391 | 2/1954 |

(Continued)

OTHER PUBLICATIONS

U.S. Appl. No. 13/075,470; filed Mar. 30, 2011; Mark Alan Davis; office action dated Jun. 13, 2013.

(Continued)

*Primary Examiner* — Frank Font
(74) *Attorney, Agent, or Firm* — Thorpe North & Western LLP

(57) ABSTRACT

A grid polarizer including an array of groups of parallel elongated ribs disposed over a substrate. Each group of elongated ribs can comprise at least four ribs. Tops of two center ribs, at a center of each group, can be substantially the same elevational height and can be higher by more than 10 nm than tops of outer ribs of the groups. A region between adjacent ribs can have an index of refraction substantially equal to one. Some or all of the ribs can comprise polarizing wires disposed over substrate rods.

14 Claims, 10 Drawing Sheets

(56) References Cited

U.S. PATENT DOCUMENTS

| | | |
|---|---|---|
| 2,887,566 A | 5/1959 | Marks |
| 3,046,839 A | 7/1962 | Bird et al. |
| 3,084,590 A | 4/1963 | Glenn, Jr. |
| 3,202,039 A | 8/1965 | Lang et al. |
| 3,213,753 A | 10/1965 | Rogers |
| 3,235,630 A | 2/1966 | Doherty et al. |
| 3,291,550 A | 12/1966 | Bird et al. |
| 3,291,871 A | 12/1966 | Francis |
| 3,293,331 A | 12/1966 | Doherty |
| 3,436,143 A | 4/1969 | Garrett |
| 3,479,168 A | 11/1969 | Bird et al. |
| 3,536,373 A | 10/1970 | Bird et al. |
| 3,566,099 A | 2/1971 | Makas |
| 3,627,431 A | 12/1971 | Komarniski |
| 3,631,288 A | 12/1971 | Rogers |
| 3,653,741 A | 4/1972 | Marks |
| 3,731,986 A | 5/1973 | Fergason |
| 3,857,627 A | 12/1974 | Harsch |
| 3,857,628 A | 12/1974 | Strong |
| 3,876,285 A | 4/1975 | Schwarzmüller |
| 3,877,789 A | 4/1975 | Marie |
| 3,912,369 A | 10/1975 | Kashnow |
| 3,969,545 A | 7/1976 | Slocum |
| 4,009,933 A | 3/1977 | Firester |
| 4,025,164 A | 5/1977 | Doriguzzi et al. |
| 4,025,688 A | 5/1977 | Nagy et al. |
| 4,049,944 A | 9/1977 | Garvin et al. |
| 4,068,260 A | 1/1978 | Ohneda et al. |
| 4,073,571 A | 2/1978 | Grinberg et al. |
| 4,104,598 A | 8/1978 | Abrams |
| 4,181,756 A | 1/1980 | Fergason |
| 4,220,705 A | 9/1980 | Sugibuchi et al. |
| 4,221,464 A | 9/1980 | Pedinoff et al. |
| 4,268,127 A | 5/1981 | Oshima et al. |
| 4,289,381 A | 9/1981 | Garvin et al. |
| 4,294,119 A | 10/1981 | Soldner |
| 4,308,079 A | 12/1981 | Venables et al. |
| 4,441,791 A | 4/1984 | Hornbeck |
| 4,456,515 A | 6/1984 | Krueger et al. |
| 4,466,704 A | 8/1984 | Schuler et al. |
| 4,492,432 A | 1/1985 | Kaufmann et al. |
| 4,512,638 A | 4/1985 | Sriram et al. |
| 4,514,479 A | 4/1985 | Ferrante |
| 4,515,441 A | 5/1985 | Wentz |
| 4,515,443 A | 5/1985 | Bly |
| 4,532,619 A | 7/1985 | Sugiyama et al. |
| 4,560,599 A | 12/1985 | Regen |
| 4,679,910 A | 7/1987 | Efron et al. |
| 4,688,897 A | 8/1987 | Grinberg et al. |
| 4,701,028 A | 10/1987 | Clerc et al. |
| 4,711,530 A | 12/1987 | Nakanowatari et al. |
| 4,712,881 A | 12/1987 | Shurtz, II et al. |
| 4,724,436 A | 2/1988 | Johansen et al. |
| 4,743,092 A | 5/1988 | Pistor |
| 4,743,093 A | 5/1988 | Oinen |
| 4,759,611 A | 7/1988 | Downey, Jr. |
| 4,759,612 A | 7/1988 | Nakatsuka et al. |
| 4,763,972 A | 8/1988 | Papuchon et al. |
| 4,795,233 A | 1/1989 | Chang |
| 4,799,776 A | 1/1989 | Yamazaki et al. |
| 4,818,076 A | 4/1989 | Heppke et al. |
| 4,840,757 A | 6/1989 | Blenkhorn |
| 4,865,670 A | 9/1989 | Marks |
| 4,870,649 A | 9/1989 | Bobeck et al. |
| 4,893,905 A | 1/1990 | Efron et al. |
| 4,895,769 A | 1/1990 | Land et al. |
| 4,904,060 A | 2/1990 | Grupp |
| 4,913,529 A | 4/1990 | Goldenberg et al. |
| 4,915,463 A | 4/1990 | Barbee, Jr. |
| 4,939,526 A | 7/1990 | Tsuda |
| 4,946,231 A | 8/1990 | Pistor |
| 4,966,438 A | 10/1990 | Mouchart et al. |
| 4,974,941 A | 12/1990 | Gibbons et al. |
| 4,991,937 A | 2/1991 | Urino |
| 5,029,988 A | 7/1991 | Urino |
| 5,039,185 A | 8/1991 | Uchida et al. |
| 5,061,050 A | 10/1991 | Ogura |
| 5,087,985 A | 2/1992 | Kitaura et al. |
| 5,092,774 A | 3/1992 | Milan |
| 5,113,285 A | 5/1992 | Franklin et al. |
| 5,115,305 A | 5/1992 | Baur |
| 5,122,887 A | 6/1992 | Mathewson |
| 5,122,907 A | 6/1992 | Slocum |
| 5,139,340 A | 8/1992 | Okumura |
| 5,157,526 A | 10/1992 | Kondo et al. |
| 5,163,877 A | 11/1992 | Marpert et al. |
| 5,177,635 A | 1/1993 | Keilmann |
| 5,196,926 A | 3/1993 | Lee |
| 5,196,953 A | 3/1993 | Yeh et al. |
| 5,198,921 A | 3/1993 | Aoshima et al. |
| 5,204,765 A | 4/1993 | Mitsui et al. |
| 5,206,674 A | 4/1993 | Puech et al. |
| 5,216,539 A | 6/1993 | Boher et al. |
| 5,222,907 A | 6/1993 | Katabuchi et al. |
| 5,225,920 A | 7/1993 | Kasazumi et al. |
| 5,235,443 A | 8/1993 | Barnik et al. |
| 5,235,449 A | 8/1993 | Imazeki et al. |
| 5,239,322 A | 8/1993 | Takanashi et al. |
| 5,245,471 A | 9/1993 | Iwatsuka et al. |
| 5,267,029 A | 11/1993 | Kurematsu et al. |
| 5,279,689 A | 1/1994 | Shvartsman |
| 5,295,009 A | 3/1994 | Barnik et al. |
| 5,298,199 A | 3/1994 | Hirose et al. |
| 5,305,143 A | 4/1994 | Taga et al. |
| 5,325,218 A | 6/1994 | Willett et al. |
| 5,333,072 A | 7/1994 | Willett |
| 5,349,192 A | 9/1994 | Mackay |
| 5,357,370 A | 10/1994 | Miyatake et al. |
| 5,383,053 A | 1/1995 | Hegg et al. |
| 5,387,953 A | 2/1995 | Minoura et al. |
| 5,391,091 A | 2/1995 | Nations |
| 5,401,587 A | 3/1995 | Motohiro et al. |
| 5,422,756 A | 6/1995 | Weber |
| 5,430,573 A | 7/1995 | Araujo et al. |
| 5,436,761 A | 7/1995 | Kamon |
| 5,455,589 A | 10/1995 | Huguenin et al. |
| 5,466,319 A | 11/1995 | Zager et al. |
| 5,477,359 A | 12/1995 | Okazaki |
| 5,485,499 A | 1/1996 | Pew et al. |
| 5,486,935 A | 1/1996 | Kalmanash |
| 5,486,949 A | 1/1996 | Schrenk et al. |
| 5,490,003 A | 2/1996 | Van Sprang |
| 5,499,126 A | 3/1996 | Abileah et al. |
| 5,504,603 A | 4/1996 | Winker et al. |
| 5,506,704 A | 4/1996 | Broer et al. |
| 5,508,830 A | 4/1996 | Imoto et al. |
| 5,510,215 A | 4/1996 | Prince et al. |
| 5,513,023 A | 4/1996 | Fritz et al. |
| 5,513,035 A | 4/1996 | Miyatake et al. |
| 5,517,356 A | 5/1996 | Araujo et al. |
| 5,535,047 A | 7/1996 | Hornbeck |
| 5,548,427 A | 8/1996 | May |
| 5,555,186 A | 9/1996 | Shioya |
| 5,557,343 A | 9/1996 | Yamagishi |
| 5,559,634 A | 9/1996 | Weber |
| 5,570,213 A | 10/1996 | Ruiz et al. |
| 5,570,215 A | 10/1996 | Omae et al. |
| 5,574,580 A | 11/1996 | Ansley |
| 5,576,854 A | 11/1996 | Schmidt et al. |
| 5,579,138 A | 11/1996 | Sannohe et al. |
| 5,594,561 A | 1/1997 | Blanchard |
| 5,599,551 A | 2/1997 | Kelly |
| 5,600,383 A | 2/1997 | Hornbeck |
| 5,602,661 A | 2/1997 | Schadt et al. |
| 5,609,939 A | 3/1997 | Petersen et al. |
| 5,612,820 A | 3/1997 | Schrenk et al. |
| 5,614,035 A | 3/1997 | Nadkarni |
| 5,619,356 A | 4/1997 | Kozo et al. |
| 5,620,755 A | 4/1997 | Smith, Jr. et al. |
| 5,626,408 A | 5/1997 | Heynderickx et al. |
| 5,638,197 A | 6/1997 | Gunning, III et al. |
| 5,652,667 A | 7/1997 | Kurogane |
| 5,658,060 A | 8/1997 | Dove |
| 5,686,979 A | 11/1997 | Weber et al. |

(56) References Cited

U.S. PATENT DOCUMENTS

| | | | |
|---|---|---|---|
| 5,706,063 | A | 1/1998 | Hong |
| 5,706,131 | A | 1/1998 | Ichimura et al. |
| 5,719,695 | A | 2/1998 | Heimbuch |
| 5,731,246 | A | 3/1998 | Bakeman et al. |
| 5,748,368 | A | 5/1998 | Tamada et al. |
| 5,748,369 | A | 5/1998 | Yokota |
| 5,751,388 | A | 5/1998 | Larson |
| 5,751,466 | A | 5/1998 | Dowling et al. |
| 5,767,827 | A | 6/1998 | Kobayashi et al. |
| 5,798,819 | A | 8/1998 | Hattori et al. |
| 5,808,795 | A | 9/1998 | Shimomura et al. |
| 5,826,959 | A | 10/1998 | Atsuchi |
| 5,826,960 | A | 10/1998 | Gotoh et al. |
| 5,828,489 | A | 10/1998 | Johnson et al. |
| 5,833,360 | A | 11/1998 | Knox et al. |
| 5,838,403 | A | 11/1998 | Jannson et al. |
| 5,841,494 | A | 11/1998 | Hall |
| 5,844,722 | A | 12/1998 | Stephens et al. |
| 5,864,427 | A | 1/1999 | Fukano et al. |
| 5,872,653 | A | 2/1999 | Schrenk et al. |
| 5,886,754 | A | 3/1999 | Kuo |
| 5,890,095 | A | 3/1999 | Barbour et al. |
| 5,898,521 | A | 4/1999 | Okada |
| 5,899,551 | A | 5/1999 | Neijzen et al. |
| 5,900,976 | A | 5/1999 | Handschy et al. |
| 5,907,427 | A | 5/1999 | Scalora et al. |
| 5,912,762 | A | 6/1999 | Li et al. |
| 5,914,818 | A | 6/1999 | Tejada et al. |
| 5,917,562 | A | 6/1999 | Woodgate et al. |
| 5,918,961 | A | 7/1999 | Ueda |
| 5,930,050 | A | 7/1999 | Dewald |
| 5,943,171 | A | 8/1999 | Budd et al. |
| 5,958,345 | A | 9/1999 | Turner et al. |
| 5,965,247 | A | 10/1999 | Jonza et al. |
| 5,969,861 | A | 10/1999 | Ueda et al. |
| 5,973,833 | A | 10/1999 | Booth et al. |
| 5,978,056 | A | 11/1999 | Shintani et al. |
| 5,982,541 | A | 11/1999 | Li et al. |
| 5,986,730 | A | 11/1999 | Hansen et al. |
| 5,991,075 | A | 11/1999 | Katsuragawa et al. |
| 5,991,077 | A | 11/1999 | Carlson et al. |
| 6,005,918 | A | 12/1999 | Harris et al. |
| 6,008,871 | A | 12/1999 | Okumura |
| 6,008,951 | A | 12/1999 | Anderson |
| 6,010,121 | A | 1/2000 | Lee |
| 6,016,173 | A | 1/2000 | Crandall |
| 6,018,841 | A | 2/2000 | Kelsay et al. |
| 6,046,851 | A * | 4/2000 | Katayama ............... 359/485.05 |
| 6,049,428 | A | 4/2000 | Khan et al. |
| 6,053,616 | A | 4/2000 | Fujimori et al. |
| 6,055,103 | A | 4/2000 | Woodgate et al. |
| 6,056,407 | A | 5/2000 | Iinuma et al. |
| 6,062,694 | A | 5/2000 | Oikawa et al. |
| 6,075,235 | A | 6/2000 | Chun |
| 6,081,312 | A | 6/2000 | Aminaka et al. |
| 6,081,376 | A | 6/2000 | Hansen et al. |
| 6,082,861 | A | 7/2000 | Dove et al. |
| 6,089,717 | A | 7/2000 | Iwai |
| 6,096,155 | A | 8/2000 | Harden et al. |
| 6,096,375 | A | 8/2000 | Ouderkirk et al. |
| 6,100,928 | A | 8/2000 | Hata |
| 6,108,131 | A | 8/2000 | Hansen et al. |
| 6,122,103 | A | 9/2000 | Perkins et al. |
| 6,122,403 | A | 9/2000 | Rhoads |
| 6,124,971 | A | 9/2000 | Ouderkirk et al. |
| 6,141,075 | A | 10/2000 | Okumuro et al. |
| 6,147,728 | A | 11/2000 | Okumura et al. |
| 6,172,813 | B1 | 1/2001 | Tadic-Galeb et al. |
| 6,172,816 | B1 | 1/2001 | Tadic-Galeb et al. |
| 6,181,386 | B1 | 1/2001 | Knox |
| 6,181,458 | B1 | 1/2001 | Brazas, Jr. et al. |
| 6,185,041 | B1 | 2/2001 | TadicGaleb et al. |
| 6,208,463 | B1 | 3/2001 | Hansen et al. |
| 6,215,547 | B1 | 4/2001 | Ramanujan et al. |
| 6,234,634 | B1 | 5/2001 | Hansen et al. |
| 6,243,199 | B1 | 6/2001 | Hansen et al. |
| 6,247,816 | B1 | 6/2001 | Cipolla et al. |
| 6,249,378 | B1 | 6/2001 | Shimamura et al. |
| 6,250,762 | B1 | 6/2001 | Kuijper |
| 6,251,297 | B1 | 6/2001 | Komuro Eiju et al. |
| 6,282,025 | B1 | 8/2001 | Huang et al. |
| 6,288,840 | B1 | 9/2001 | Perkins et al. |
| 6,291,797 | B1 | 9/2001 | Koyama et al. |
| 6,310,345 | B1 | 10/2001 | Pittman et al. |
| 6,339,454 | B1 | 1/2002 | Knox |
| 6,340,230 | B1 | 1/2002 | Bryars et al. |
| 6,345,895 | B1 | 2/2002 | Maki et al. |
| 6,348,995 | B1 | 2/2002 | Hansen et al. |
| 6,375,330 | B1 | 4/2002 | Mihalakis |
| 6,390,626 | B2 | 5/2002 | Knox |
| 6,398,364 | B1 | 6/2002 | Bryars |
| 6,406,151 | B1 | 6/2002 | Fujimori |
| 6,409,525 | B1 | 6/2002 | Hoelscher et al. |
| 6,411,749 | B2 | 6/2002 | Teng et al. |
| 6,424,436 | B1 | 7/2002 | Yamanaka |
| 6,426,837 | B1 | 7/2002 | Clark et al. |
| 6,447,120 | B1 | 9/2002 | Hansen et al. |
| 6,452,724 | B1 | 9/2002 | Hansen et al. |
| 6,460,998 | B1 | 10/2002 | Watanabe |
| 6,473,236 | B2 | 10/2002 | Tadic-Galeb et al. |
| 6,486,997 | B1 | 11/2002 | Bruzzone et al. |
| 6,490,017 | B1 | 12/2002 | Huang et al. |
| 6,496,239 | B2 | 12/2002 | Seiberle |
| 6,496,287 | B1 | 12/2002 | Seiberle et al. |
| 6,511,183 | B2 | 1/2003 | Shimizu et al. |
| 6,514,674 | B1 | 2/2003 | Iwasaki |
| 6,520,645 | B2 | 2/2003 | Yamamoto et al. |
| 6,532,111 | B2 | 3/2003 | Kurtz et al. |
| 6,547,396 | B1 | 4/2003 | Svardal et al. |
| 6,580,471 | B2 | 6/2003 | Knox |
| 6,583,930 | B1 | 6/2003 | Schrenk et al. |
| 6,585,378 | B2 | 7/2003 | Kurtz et al. |
| 6,624,936 | B2 | 9/2003 | Kotchick et al. |
| 6,643,077 | B2 | 11/2003 | Magarill et al. |
| 6,654,168 | B1 | 11/2003 | Borrelli |
| 6,661,475 | B1 | 12/2003 | Stahl et al. |
| 6,661,484 | B1 | 12/2003 | Iwai et al. |
| 6,665,119 | B1 | 12/2003 | Kurtz et al. |
| 6,666,556 | B2 | 12/2003 | Hansen et al. |
| 6,669,343 | B2 | 12/2003 | Shahzad et al. |
| 6,698,891 | B2 | 3/2004 | Kato |
| 6,704,469 | B1 | 3/2004 | Xie et al. |
| 6,710,921 | B2 | 3/2004 | Hansen et al. |
| 6,714,350 | B2 | 3/2004 | Silverstein et al. |
| 6,721,096 | B2 | 4/2004 | Bruzzone et al. |
| 6,739,723 | B1 | 5/2004 | Haven et al. |
| 6,746,122 | B2 | 6/2004 | Knox |
| 6,764,181 | B2 | 7/2004 | Magarill et al. |
| 6,769,779 | B1 | 8/2004 | Ehrne et al. |
| 6,781,640 | B1 | 8/2004 | Huang |
| 6,785,050 | B2 | 8/2004 | Lines et al. |
| 6,788,461 | B2 | 9/2004 | Kurtz et al. |
| 6,805,445 | B2 | 10/2004 | Silverstein et al. |
| 6,809,864 | B2 | 10/2004 | Martynov et al. |
| 6,809,873 | B2 | 10/2004 | Cobb |
| 6,811,274 | B2 | 11/2004 | Olczak |
| 6,813,077 | B2 | 11/2004 | Borrelli et al. |
| 6,816,290 | B2 | 11/2004 | Mukawa |
| 6,821,135 | B1 | 11/2004 | Martin |
| 6,823,093 | B2 | 11/2004 | Chang et al. |
| 6,829,090 | B2 | 12/2004 | Katsumata et al. |
| 6,844,971 | B2 | 1/2005 | Silverstein et al. |
| 6,846,089 | B2 | 1/2005 | Stevenson et al. |
| 6,859,303 | B2 | 2/2005 | Wang et al. |
| 6,876,784 | B2 | 4/2005 | Nikolov et al. |
| 6,896,371 | B2 | 5/2005 | Shimizu et al. |
| 6,897,926 | B2 | 5/2005 | Mi et al. |
| 6,899,440 | B2 | 5/2005 | Bierhuizen |
| 6,900,866 | B2 | 5/2005 | Kurtz et al. |
| 6,909,473 | B2 | 6/2005 | Mi et al. |
| 6,920,272 | B2 | 7/2005 | Wang |
| 6,922,287 | B2 | 7/2005 | Wiki et al. |
| 6,926,410 | B2 | 8/2005 | Weber et al. |
| 6,927,915 | B2 | 8/2005 | Nakai |

(56) References Cited

U.S. PATENT DOCUMENTS

| | | |
|---|---|---|
| 6,934,082 B2 | 8/2005 | Allen et al. |
| 6,943,941 B2 | 9/2005 | Flagello et al. |
| 6,947,215 B2 | 9/2005 | Hoshi |
| 6,954,245 B2 | 10/2005 | Mi et al. |
| 6,972,906 B2 | 12/2005 | Hasman et al. |
| 6,976,759 B2 | 12/2005 | Magarill et al. |
| 6,981,771 B1 | 1/2006 | Arai et al. |
| 7,009,768 B2 | 3/2006 | Sakamoto |
| 7,013,064 B2 | 3/2006 | Wang |
| 7,023,512 B2 | 4/2006 | Kurtz et al. |
| 7,023,602 B2 | 4/2006 | Aastuen et al. |
| 7,025,464 B2 | 4/2006 | Beeson et al. |
| 7,026,046 B2 | 4/2006 | Edlinger et al. |
| 7,046,422 B2 | 5/2006 | Kimura et al. |
| 7,046,441 B2 | 5/2006 | Huang et al. |
| 7,046,442 B2 | 5/2006 | Suganuma |
| 7,050,233 B2 | 5/2006 | Nikolov et al. |
| 7,050,234 B2 | 5/2006 | Gage et al. |
| 7,075,602 B2 | 7/2006 | Sugiura et al. |
| 7,075,722 B2 | 7/2006 | Nakai |
| 7,085,050 B2 | 8/2006 | Florence |
| 7,099,068 B2 | 8/2006 | Wang et al. |
| 7,113,335 B2 | 9/2006 | Sales |
| 7,116,478 B2 | 10/2006 | Momoki et al. |
| 7,129,183 B2 | 10/2006 | Mori et al. |
| 7,131,737 B2 | 11/2006 | Silverstein et al. |
| 7,142,363 B2 | 11/2006 | Sato et al. |
| 7,142,375 B2 | 11/2006 | Nikolov et al. |
| 7,155,073 B2 | 12/2006 | Momoki et al. |
| 7,158,302 B2 | 1/2007 | Chiu et al. |
| 7,159,987 B2 | 1/2007 | Sakata |
| 7,177,259 B2 | 2/2007 | Nishi et al. |
| 7,184,115 B2 | 2/2007 | Mi et al. |
| 7,185,984 B2 | 3/2007 | Akiyama |
| 7,203,001 B2 | 4/2007 | Deng et al. |
| 7,213,920 B2 | 5/2007 | Matsui et al. |
| 7,220,371 B2 | 5/2007 | Suganuma |
| 7,221,420 B2 | 5/2007 | Silverstein et al. |
| 7,221,501 B2 | 5/2007 | Flagello et al. |
| 7,227,684 B2 | 6/2007 | Wang et al. |
| 7,230,766 B2 | 6/2007 | Rogers |
| 7,234,816 B2 | 6/2007 | Bruzzone et al. |
| 7,236,655 B2 | 6/2007 | Momoki et al. |
| 7,255,444 B2 | 8/2007 | Nakashima et al. |
| 7,256,938 B2 | 8/2007 | Barton et al. |
| 7,268,946 B2 | 9/2007 | Wang |
| 7,297,386 B2 | 11/2007 | Suzuki et al. |
| 7,298,475 B2 | 11/2007 | Gandhi et al. |
| 7,306,338 B2 | 12/2007 | Hansen et al. |
| 7,375,887 B2 | 5/2008 | Hansen |
| 7,414,784 B2 | 8/2008 | Mi et al. |
| 7,466,484 B2 | 12/2008 | Mi et al. |
| 7,545,564 B2 | 6/2009 | Wang |
| 7,561,332 B2 | 7/2009 | Little et al. |
| 7,570,424 B2 | 8/2009 | Perkins et al. |
| 7,619,816 B2 | 11/2009 | Deng et al. |
| 7,630,133 B2 | 12/2009 | Perkins |
| 7,670,758 B2 | 3/2010 | Wang et al. |
| 7,692,860 B2 | 4/2010 | Sato et al. |
| 7,722,194 B2 | 5/2010 | Amako et al. |
| 7,755,718 B2 | 7/2010 | Amako et al. |
| 7,789,515 B2 | 9/2010 | Hansen |
| 7,800,823 B2 | 9/2010 | Perkins |
| 7,813,039 B2 | 10/2010 | Perkins |
| 7,944,544 B2 | 5/2011 | Amako et al. |
| 7,961,393 B2 | 6/2011 | Perkins |
| 8,009,355 B2 | 8/2011 | Nakai |
| 8,027,087 B2 | 9/2011 | Perkins et al. |
| 8,138,534 B2 | 3/2012 | Adkisson et al. |
| 8,493,658 B2 * | 7/2013 | Nishida et al. ........... 359/485.05 |
| 8,696,131 B2 * | 4/2014 | Sawaki ............ 353/20 |
| 2001/0006421 A1 | 7/2001 | Parriaux |
| 2001/0053023 A1 | 12/2001 | Kameno et al. |
| 2002/0003661 A1 | 1/2002 | Nakai |
| 2002/0015135 A1 | 2/2002 | Hanson |
| 2002/0040892 A1 | 4/2002 | Koyama et al. |
| 2002/0122235 A1 | 9/2002 | Kurtz et al. |
| 2002/0167727 A1 | 11/2002 | Hansen et al. |
| 2002/0176166 A1 | 11/2002 | Schuster |
| 2002/0181824 A1 | 12/2002 | Huang et al. |
| 2002/0191286 A1 | 12/2002 | Gale et al. |
| 2003/0058408 A1 | 3/2003 | Magarill et al. |
| 2003/0072079 A1 | 4/2003 | Silverstein et al. |
| 2003/0081178 A1 | 5/2003 | Shimizu et al. |
| 2003/0081179 A1 | 5/2003 | Pentico et al. |
| 2003/0117708 A1 | 6/2003 | Kane |
| 2003/0142400 A1 * | 7/2003 | Hansen et al. ........... 359/486 |
| 2003/0156325 A1 | 8/2003 | Hoshi |
| 2003/0161029 A1 | 8/2003 | Kurtz et al. |
| 2003/0193652 A1 | 10/2003 | Pentico et al. |
| 2003/0202157 A1 | 10/2003 | Pentico et al. |
| 2003/0218722 A1 | 11/2003 | Tsao et al. |
| 2003/0223118 A1 | 12/2003 | Sakamoto |
| 2003/0223670 A1 | 12/2003 | Nikolov et al. |
| 2003/0224116 A1 | 12/2003 | Chen et al. |
| 2003/0227678 A1 | 12/2003 | Lines et al. |
| 2004/0008416 A1 | 1/2004 | Okuno |
| 2004/0042101 A1 | 3/2004 | Wang |
| 2004/0047039 A1 | 3/2004 | Wang et al. |
| 2004/0047388 A1 | 3/2004 | Wang et al. |
| 2004/0051928 A1 | 3/2004 | Mi |
| 2004/0070829 A1 | 4/2004 | Kurtz et al. |
| 2004/0071425 A1 | 4/2004 | Wang |
| 2004/0095637 A1 | 5/2004 | Nikolov et al. |
| 2004/0120041 A1 | 6/2004 | Silverstein et al. |
| 2004/0125449 A1 | 7/2004 | Sales |
| 2004/0165126 A1 | 8/2004 | Ooi et al. |
| 2004/0169924 A1 | 9/2004 | Flagello et al. |
| 2004/0174596 A1 | 9/2004 | Umeki |
| 2004/0201889 A1 | 10/2004 | Wang et al. |
| 2004/0201890 A1 | 10/2004 | Crosby |
| 2004/0218270 A1 | 11/2004 | Wang |
| 2004/0227994 A1 | 11/2004 | Ma et al. |
| 2004/0233362 A1 | 11/2004 | Kashima |
| 2004/0240777 A1 | 12/2004 | Woodgate et al. |
| 2004/0258355 A1 | 12/2004 | Wang et al. |
| 2005/0008839 A1 | 1/2005 | Cramer et al. |
| 2005/0018308 A1 | 1/2005 | Cassarley et al. |
| 2005/0045799 A1 | 3/2005 | Deng et al. |
| 2005/0046941 A1 | 3/2005 | Satoh et al. |
| 2005/0078374 A1 | 4/2005 | Tairo et al. |
| 2005/0084613 A1 | 4/2005 | Wang et al. |
| 2005/0088739 A1 | 4/2005 | Chiu et al. |
| 2005/0122587 A1 | 6/2005 | Ouderkirk et al. |
| 2005/0128567 A1 | 6/2005 | Wang et al. |
| 2005/0128587 A1 | 6/2005 | Suganuma |
| 2005/0152033 A1 | 7/2005 | Kang et al. |
| 2005/0179995 A1 | 8/2005 | Nikolov et al. |
| 2005/0180014 A1 | 8/2005 | Nikolov et al. |
| 2005/0181128 A1 | 8/2005 | Nikolov et al. |
| 2005/0190445 A1 | 9/2005 | Fukuzaki |
| 2005/0195485 A1 | 9/2005 | Hirai et al. |
| 2005/0201656 A1 | 9/2005 | Nikolov et al. |
| 2005/0206847 A1 | 9/2005 | Hansen et al. |
| 2005/0213043 A1 | 9/2005 | Nakashima et al. |
| 2005/0259324 A1 | 11/2005 | Flagello et al. |
| 2005/0271091 A1 | 12/2005 | Wang |
| 2005/0275944 A1 | 12/2005 | Wang et al. |
| 2005/0277063 A1 | 12/2005 | Wang et al. |
| 2006/0001969 A1 | 1/2006 | Wang et al. |
| 2006/0061862 A1 | 3/2006 | Mi et al. |
| 2006/0072074 A1 | 4/2006 | Matsui et al. |
| 2006/0072194 A1 | 4/2006 | Lee |
| 2006/0087602 A1 | 4/2006 | Kunisada et al. |
| 2006/0092513 A1 | 5/2006 | Momoki |
| 2006/0103810 A1 | 5/2006 | Ma et al. |
| 2006/0113279 A1 | 6/2006 | Little |
| 2006/0118514 A1 | 6/2006 | Little et al. |
| 2006/0119937 A1 | 6/2006 | Perkins |
| 2006/0127829 A1 | 6/2006 | Deng et al. |
| 2006/0127830 A1 | 6/2006 | Deng et al. |
| 2006/0187416 A1 | 8/2006 | Ouchi et al. |
| 2006/0192960 A1 | 8/2006 | Renes et al. |
| 2006/0215263 A1 | 9/2006 | Mi et al. |

(56) References Cited

U.S. PATENT DOCUMENTS

| | | | |
|---|---|---|---|
| 2006/0238715 A1 | 10/2006 | Hirata et al. |
| 2006/0268207 A1 | 11/2006 | Tan et al. |
| 2007/0146644 A1 | 6/2007 | Mi et al. |
| 2007/0183035 A1 | 8/2007 | Asakawa et al. |
| 2007/0195676 A1 | 8/2007 | Hendriks et al. |
| 2007/0217008 A1 | 9/2007 | Wang et al. |
| 2007/0223349 A1 | 9/2007 | Shimada et al. |
| 2007/0242187 A1 | 10/2007 | Yamaki et al. |
| 2007/0242228 A1 | 10/2007 | Chen et al. |
| 2007/0242352 A1 | 10/2007 | MacMaster |
| 2007/0297052 A1 | 12/2007 | Wang et al. |
| 2008/0037101 A1 | 2/2008 | Jagannathan et al. |
| 2008/0038467 A1 | 2/2008 | Jagannathan et al. |
| 2008/0055549 A1 | 3/2008 | Perkins |
| 2008/0055719 A1 | 3/2008 | Perkins |
| 2008/0055720 A1 | 3/2008 | Perkins |
| 2008/0055721 A1 | 3/2008 | Perkins |
| 2008/0055722 A1 | 3/2008 | Perkins |
| 2008/0055723 A1 | 3/2008 | Gardner |
| 2008/0094547 A1 | 4/2008 | Sugita et al. |
| 2008/0137188 A1 | 6/2008 | Sato et al. |
| 2008/0192346 A1 | 8/2008 | Kim et al. |
| 2008/0316599 A1 | 12/2008 | Wang et al. |
| 2009/0009865 A1 | 1/2009 | Nishida |
| 2009/0040607 A1 | 2/2009 | Amako et al. |
| 2009/0041971 A1 | 2/2009 | Wang et al. |
| 2009/0053655 A1 | 2/2009 | Deng et al. |
| 2009/0109377 A1 | 4/2009 | Sawaki et al. |
| 2010/0103517 A1 | 4/2010 | Davis et al. |
| 2010/0188747 A1* | 7/2010 | Amako et al. ............... 359/486 |
| 2010/0238555 A1 | 9/2010 | Amako et al. |
| 2010/0239828 A1 | 9/2010 | Cornaby |
| 2010/0328768 A1 | 12/2010 | Lines |
| 2010/0328769 A1 | 12/2010 | Perkins |
| 2011/0080640 A1 | 4/2011 | Kaida et al. |
| 2011/0096396 A1 | 4/2011 | Kaida et al. |
| 2011/0115991 A1 | 5/2011 | Sawaki |
| 2011/0235181 A1 | 9/2011 | Hayashibe et al. |
| 2012/0008205 A1 | 1/2012 | Perkins et al. |
| 2012/0075699 A1 | 3/2012 | Davis |
| 2012/0250154 A1 | 10/2012 | Davis |
| 2013/0077164 A1 | 3/2013 | Davis |
| 2013/0201557 A1 | 8/2013 | Davis |
| 2013/0250411 A1 | 9/2013 | Davis |
| 2013/0258471 A1 | 10/2013 | Davis |

FOREIGN PATENT DOCUMENTS

| | | |
|---|---|---|
| CN | 1692291 | 11/2005 |
| DE | 296391 | 2/1950 |
| DE | 3707984 A1 | 9/1988 |
| DE | 10327963 | 1/2005 |
| DE | 10341596 | 4/2005 |
| DE | 10 2004 04122 | 3/2006 |
| EP | 300563 | 1/1989 |
| EP | 407830 B1 | 1/1991 |
| EP | 0731456 | 9/1996 |
| EP | 1239308 | 2/2002 |
| EP | 2270553 | 1/2011 |
| JP | 56156815 | 12/1981 |
| JP | 58-042003 | 3/1983 |
| JP | 61122626 | 6/1986 |
| JP | 1028675 | 1/1989 |
| JP | 02-308106 | 12/1990 |
| JP | 2308106 | 12/1990 |
| JP | 3005706 | 1/1991 |
| JP | H03084502 | 4/1991 |
| JP | 3126910 | 5/1991 |
| JP | 04 366916 | 6/1991 |
| JP | 4-12241 | 1/1992 |
| JP | 4331913 | 11/1992 |
| JP | 5134115 | 5/1993 |
| JP | 5288910 | 11/1993 |
| JP | 5341234 | 12/1993 |
| JP | 6138413 | 5/1994 |
| JP | 06-174907 | 6/1994 |
| JP | 6202042 | 7/1994 |
| JP | 7005316 | 1/1995 |
| JP | 7-146469 | 6/1995 |
| JP | 7202266 | 8/1995 |
| JP | 7294850 | 11/1995 |
| JP | 7294851 | 11/1995 |
| JP | 7318861 | 12/1995 |
| JP | 9015534 | 1/1997 |
| JP | 9090122 | 4/1997 |
| JP | 9090129 | 4/1997 |
| JP | 9178943 | 7/1997 |
| JP | 9212896 | 8/1997 |
| JP | 9288211 | 11/1997 |
| JP | 10-003078 | 1/1998 |
| JP | 10073722 A | 3/1998 |
| JP | 10084502 | 3/1998 |
| JP | 10-153706 | 6/1998 |
| JP | 10-260403 | 9/1998 |
| JP | 11-014814 | 1/1999 |
| JP | 1-164819 | 3/1999 |
| JP | 11064794 | 3/1999 |
| JP | 11142650 | 5/1999 |
| JP | 11-174396 | 7/1999 |
| JP | 11237507 | 8/1999 |
| JP | 11-258603 | 9/1999 |
| JP | 11-306581 | 11/1999 |
| JP | 2000-147487 | 5/2000 |
| JP | 2000284117 | 10/2000 |
| JP | 2001074935 | 3/2001 |
| JP | 2003502708 | 1/2003 |
| JP | 2004157159 | 6/2004 |
| JP | 2004309903 | 11/2004 |
| JP | 2005151154 | 5/2005 |
| JP | 20054513547 | 5/2005 |
| JP | 2005195824 | 7/2005 |
| JP | 2006047813 | 2/2006 |
| JP | 2006-133402 | 5/2006 |
| JP | 7072428 | 7/2006 |
| JP | 2006201540 | 8/2006 |
| JP | 2006/330178 | 12/2006 |
| JP | 2007/58100 | 3/2007 |
| JP | 2007/101859 | 4/2007 |
| KR | 2003-0079268 | 10/2003 |
| KR | 10-2003-0090021 | 11/2003 |
| KR | 10-2004-0046137 | 6/2004 |
| KR | 10-2005-0017871 | 2/2005 |
| KR | 10-0707083 | 4/2007 |
| SU | 1283685 | 1/1987 |
| SU | 1781659 A1 | 12/1992 |
| WO | WO96/15474 | 5/1996 |
| WO | WO 99/59005 | 11/1999 |
| WO | WO0070386 | 11/2000 |
| WO | WO 01/51964 | 7/2001 |
| WO | WO 02/21205 | 3/2002 |
| WO | WO 02/077588 | 10/2002 |
| WO | WO 03/069381 | 8/2003 |
| WO | WO03/069381 | 8/2003 |
| WO | WO03/107046 | 12/2003 |
| WO | WO2004013684 | 2/2004 |
| WO | WO2005/065182 | 7/2005 |
| WO | WO2005/101112 | 10/2005 |
| WO | WO 2005/123277 | 12/2005 |
| WO | WO2006/014408 | 2/2006 |
| WO | WO 2006/036546 | 4/2006 |
| WO | WO 2011/056496 | 5/2011 |

OTHER PUBLICATIONS

Sze, VLSI Technology, $2^{nd}$ Ed.; pp. 198-199; 1988.
U.S. Appl. No. 13/224,719, filed Sep. 2, 2011; Mark Alan Davis; office action dated Mar. 29, 2013.
U.S. Appl. No. 13/495,296, filed Jun. 13, 2012; Michael Lines; office action dated Sep. 25, 2013.
Auton et al, "Grid Polarizers for Use in the Near Infrared." Infrared Physics, 1972, vol. 12, pp. 95-100.
Auton, "Infrared Transmission Polarizers by Photolithography." Applied Optics Jun. 1967 vol. 6, No. 6, pp. 1023-1027.

(56) References Cited

OTHER PUBLICATIONS

Baur, "A new type of beam splitting polarizer cube." Meadowlark Optics, 2005, pp. 1-9.
Bird et al., "The Wire Grid as a Near-Infrared Polarizer." J. Op. Soc. Am. vol. 50 No. 9 (1960).
Deng et al. "Multiscale structures for polarization control by using imprint and UV lithography." Proc. of SPIE, 2005, pp. 1-12. vol. 6003.
Deng et al. "Wideband antireflective polarizers based on integrated diffractive multilayer microstructures." Optics Letters, Feb. 1, 2006, pp. 344- 346, vol. 31., No. 3.
Flanders, "Application of 100 Å linewidth structures fabricated by shadowing techniques." J. Vac. Sci. Technol., 19(4), Nov./Dec. 1981.
Flanders, "Submicron periodicity gratings as artificial anisotropic dielectrics." Appl. Phys. Lett. 42 (6), Mar. 15, 1983, pp. 492-494.
Handbook of Optics vol. II, $2^{nd}$ Edition, pp. 3.32-3.35.
Handbook of Optics, 1978, pp. 10-68-10-77.
Hass et al, "Sheet Infrared Transmission Polarizers." Applied Optics Aug. 1965, vol. 4, No. 8 pp. 1027-1031.
Knop, "Reflection Grating Polarizer for the Infrared." Optics Communications vol. 26, No. 3, Sep. 1978.
Li Li et al , "Visible broadband, wide-angle, thin-film multilayer polarizing beam splitter." Applied Optics May 1, 1996, vol. 35, No. 13, pp. 2221-2224.
Lopez, et al. "Wave-plate polarizing beam splitter based on a form-birefringent multilayer grating." Optics Letters, vol. 23, No. 20, pp. 1627-1629, Oct. 15, 1998.
ProFlux, www.moxtek.comm pp. 1-4.
Richter, Ivan et al. "Design considerations of form birefringent microstructures." Applied Optics, vol. 34, No. 14, pp. 2421-2429, May 10, 1995.
Savas et al. "Achromatic interferometric lithography for 100-nm-period gratings and grids." Journal Vac. Sci. Technology B, Nov./Dec. 1995, pp. 2732-2735, vol. 13, No. 6.
Sonek et al., "Ultraviolet grating polarizers." J. Vac. Sci. Technol., 19(4), Nov./Dec. 1981, pp. 921-923.
Stenkamp et al, "Grid polarizer for the visible spectral region." SPIE vol. 2213 pp. 288-296.
Tyan, Rong-Chung et al. "Design, fabrication, and characterization of form-birefringent multilayer polarizing beam splitter." Optical Society of America, vol. 14, No. 7, pp. 1627-1636, Jul. 1997.
Wang, et al., "Innovative High-Performance Nanowire-Grid Polarizers and integrated Isolators, " IEEE Journal of Selected Topics in Quantum Electronics, pgs. 241-253, vol. 11 No. 1 Jan./Feb. 2005.
U.S. Appl. No. 13/326,566, filed Dec. 15, 2011; Mark Alan Davis; office action dated Dec. 16, 2013.
U.S. Appl. No. 14/035,478, filed Sep. 24, 2013; Mark Davis; office action dated Dec. 27, 2013.
PCT/US2012/043979; Filed Sep. 2, 2011; Moxtek, Inc. et al.; international search report dated Jan. 31, 2013.

\* cited by examiner

FINE PITCH GRID POLARIZER

CLAIM OF PRIORITY

This is a continuation-in-part of U.S. patent application Ser. No. 13/224,719, filed on Sep. 2, 2011, which claims priority to U.S. Provisional Patent Application Ser. Nos. 61/384,796, filed on Sep. 21, 2010, and 61/384,802, filed on Sep. 21, 2010, which are hereby incorporated herein by reference in their entirety.

BACKGROUND

Nanometer-sized devices, such as grid polarizers, can be limited in performance by the distance between adjacent features, or the pitch of one feature to the next. For example, for effective polarization of electromagnetic radiation, the pitch in a grid polarizer should be less than half the wavelength of the electromagnetic radiation. Grid polarizers, with pitch smaller than half the wavelength of visible light, have been demonstrated. See for example U.S. Pat. Nos. 6,208,463; 6,122,103; and 6,243,199. For higher polarization contrast and to allow polarization of smaller wavelengths, such as for polarization of ultra-violet light and x-rays, smaller pitches are needed. Various methods have been proposed to solve this problem. See for example U.S. Pat. No. 7,692,860 and U.S. Publication numbers 2009/0041971 and 2009/0053655.

A desirable feature of grid polarizers is to polarize a broad spectrum of electromagnetic radiation with a single polarizer. Grid polarizers are typically formed with ribs that are the same height. It would be beneficial to form grid polarizers with variable rib height in order to allow tuning of the grid polarizer for multiple wavelengths and to allow for a smoother Ts curve. Methods have been proposed for grid polarizers with different height ribs. See for example U.S. Publication numbers 20080037101 and 20080038467.

Grid polarizers are typically formed with ribs that are situated along a single plane. It would be beneficial to form grid polarizers with ribs situated at multiple planes (i.e. multiple elevational heights in relation to a surface of the substrate). A grid polarizer with ribs that are situated along multiple planes may be tuned to multiple wavelengths and may allow for a smoother Ts curve. See for example U.S. Publication numbers 20080037101 and 20080038467.

Grid polarizers are typically formed with ribs that are all comprised of single materials.

SUMMARY

It has also been recognized that it would be advantageous to develop a nanometer-sized device, such as a grid polarizer, with very small spacing between adjacent features, i.e. small pitch. It has been recognized that it would be advantageous to develop a nanometer-sized device, such as a grid polarizer in which there is variable rib height, with ribs situated at multiple planes. Furthermore, it has been recognized that it would be advantageous to develop a nanometer-sized device, such as a grid polarizer, with some ribs comprised one material, and other ribs comprised of a different material for tuning the grid polarizer to multiple wavelengths.

In one embodiment, the present invention comprises a grid polarizer including an array of groups of parallel elongated ribs disposed over a substrate. Each group of elongated ribs can comprise at least four ribs. A region between adjacent ribs can have an index of refraction substantially equal to one. Tops of two center ribs, at a center of each group, can be substantially the same elevational height and can be higher by more than 10 nm than tops of outer ribs of the respective group.

In another embodiment, the present invention comprises a grid polarizer including an array of groups of parallel elongated ribs disposed over a substrate. Each group of elongated ribs can comprise at least four ribs. At least two interior ribs in each group can comprise polarizing wires disposed over substrate rods. Tops of two center ribs, at a center of each group, can be substantially the same elevational height and can be higher by more than 10 nm than tops of outer ribs of the respective group.

In another embodiment, the present invention comprises a method for making a grid polarizer. The method includes forming multi-step ribbons with steps in a substrate; coating a surface of the multi-step ribbons with a coating; removing the coating on horizontal surfaces of the steps while leaving the coating on vertical surfaces of the steps, forming wires, and preferentially etching substrate ribbons between wires to form separate ribs.

BRIEF DESCRIPTION OF THE DRAWINGS

FIG. 11 is schematic cross-sectional side view of patterned resist 111 over a substrate 11, showing one step in the manufacture of a grid polarizer, in accordance with an embodiment of the present invention;

FIGS. 12 and 13 are schematic cross-sectional side views of patterned resist 111 over a substrate 11, and showing isotropic etching between 122 and beneath 121 the resist 111, in accordance with a step in manufacturing an embodiment of the present invention;

FIG. 14 is schematic cross-sectional side view of patterned resist 111 over substrate ribbons 90, and an anisotropic etch between 122 the resist, in accordance with a step in manufacturing an embodiment of the present invention;

FIG. 15 is schematic cross-sectional side view of a coating C over substrate ribbons 90, in accordance with a step in manufacturing an embodiment of the present invention;

FIG. 16 is schematic cross-sectional side view of strips 163 on sides of substrate ribbons 90, in accordance with a step in manufacturing an embodiment of the present invention;

FIG. 17 is schematic cross-sectional side view showing a second coating 184 for formation of polarizing bars 74, in accordance with a step in manufacturing the grid polarizer 70 shown in FIG. 7;

FIGS. 18-21 are schematic cross-sectional side views showing various steps in manufacture of the grid polarizer 80 shown in FIG. 8.

DEFINITIONS

Figure 1:
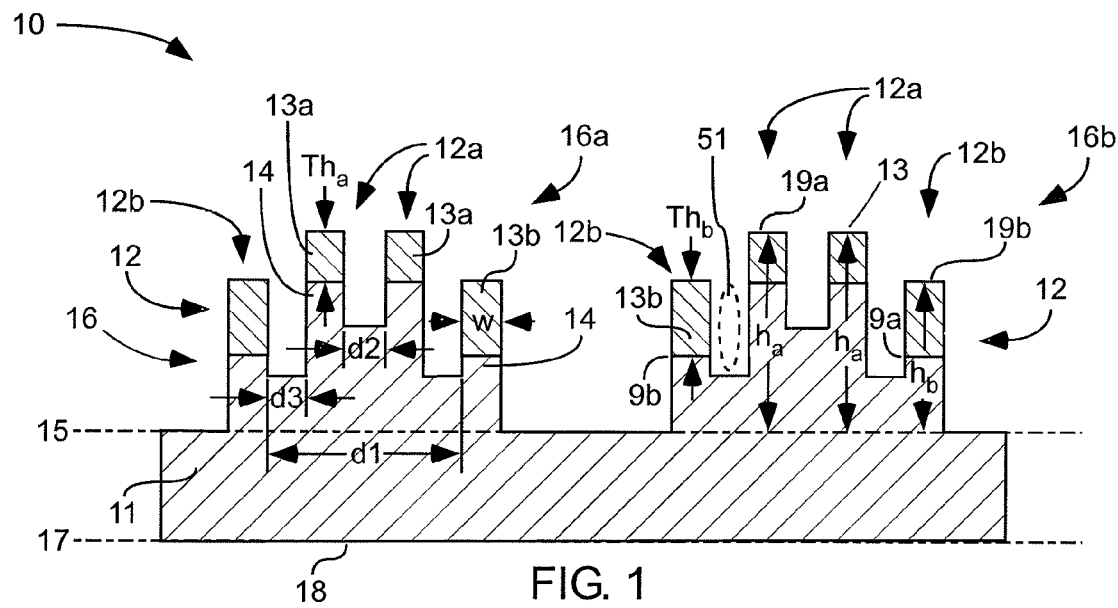
FIG. 1 is schematic cross-sectional side view of a grid polarizer 10 with groups 16a and 16b of elongated ribs 12 having four ribs 12 in each group 16a and 16b, the ribs 12 comprising polarizing wires 13 disposed over substrate rods 14, in accordance with an embodiment of the present invention.

As used in this description and in the appended claims, the word "electromagnetic radiation" includes infrared, visible, ultraviolet, and x-ray regions of the electromagnetic spectrum.

Various elongated structures are described herein. The terms rib 12, coating rib 202, etch deposition rib 83, wire 13, rod 14, bar 74, strip 163, and ribbon 90 are used to describe various elongated structures having lengths significantly longer than width or height. These terms refer to different structures, but all have a similarity of being elongated structures having lengths significantly longer than width or height. Ribs, wires, rods, bars, strips, and ribbons can have various cross-sectional shapes and can refer to polarizing structures, supports for polarizing structures, or supports for manufacture of polarizing structures, in a grid polarizer. The lengths of these structures extends into (and out of) the page of the FIGs. as understood by those of skill in the art.

DETAILED DESCRIPTION

As illustrated in FIG. 1, a grid polarizer 10 is shown comprising an array of groups 16 of parallel elongated ribs 12 disposed over a substrate 11. The substrate 11 can be transparent to incoming light (the light for which polarization is desired). The substrate 11 can be a rigid material such as glass, quartz, silicon, or germanium. The substrate 11 can also be a flexible material such as a casting film, polymer, or embossing substrate. The substrate 11 can consist of a single layer of a single material or can comprise multiple layers of different materials. For example, the substrate 11 can be formed by applying thin film layers of different materials on a primary substrate through processes such as chemical vapor deposition (CVD) or physical vapor deposition (PVD).

FIGS. 1-5 show two groups in each figure, but there may be, and normally would be, many more groups than two. Four ribs 12 are shown in each group in FIGS. 1-3, but there may be more than four ribs 12, as will be described hereafter. Each rib 12 can be paired with another rib 12 of substantially the same elevational height on an opposite side of a stepped pyramidal cross-sectional shape. Thus, two center ribs 12a, at a center of the groups 16a and 16b, can have one height $h_a$ and outer ribs 12b, adjacent to the two center ribs 12a, can have another height $h_b$. Tops 19a of the two center ribs 12a, can have substantially the same elevational height $h_a$ and can be higher by more than 10 nm ($h_a-h_b>10$ nm) in one aspect, higher by more than 20 nm ($h_a-h_b>20$ nm) in another aspect, higher by more than 30 nm ($h_a-h_b>30$ nm) in another aspect, or higher by more than 50 nm ($h_a-h_b>50$ nm) in another aspect, than tops 19b of outer ribs 16b of the corresponding or respective group 16.

The two center ribs 12a are flanked by outer ribs 12b. The two center ribs 12a can be called inner ribs with respect to outer ribs 12b. The outer ribs 12b are a pair and can have substantially the same elevational height $h_b$ with respect to each other. The height of the ribs 12 can be measured from a plane 15 parallel with the lowest substrate etch or a plane 17 parallel with a bottom 18 of the substrate.

The ribs 12 may be used for polarizing incident electromagnetic radiation. For efficient polarization, it can be important to have a pitch between polarizing elements that is significantly less than half the wavelength of the electromagnetic radiation. Polarizers with a larger pitch could be used for polarization of infrared light, polarizers with a very small pitch could be used for polarization of x-rays or ultraviolet light, and polarizers with an intermediate pitch could be used for polarization of visible light.

Figure 3:
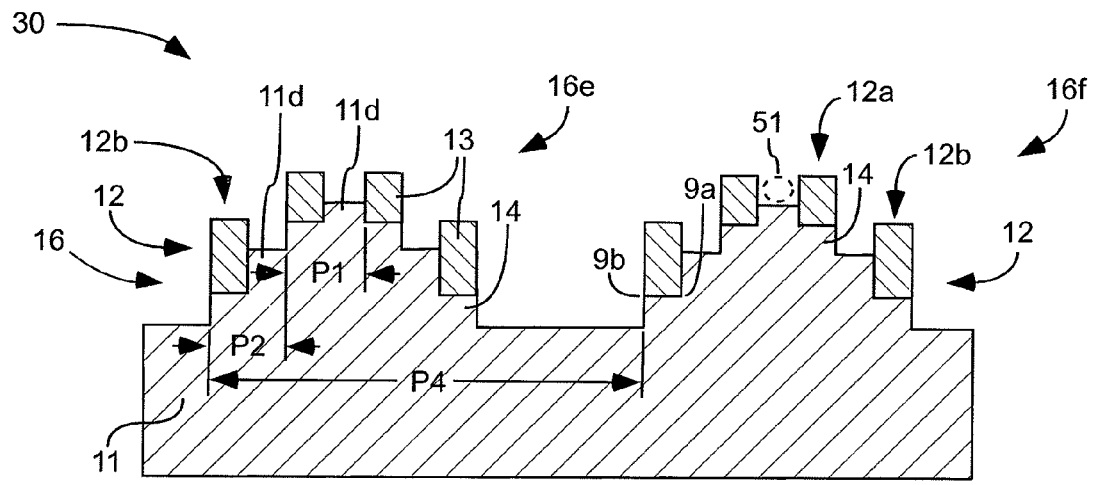
FIG. 3 is schematic cross-sectional side view of a grid polarizer 30 with groups 16e and 16f of elongated ribs 12 having four ribs 12 in each group 16e and 16f and substrate 11d existing partially between adjacent wires, in accordance with an embodiment of the present invention.

The grid polarizers described herein can have different pitches. Shown in FIG. 3 are three different pitches. There is one pitch P1 for the two center ribs 12a. There can be a different pitch P2 for an outer rib 16b in relation to a center rib 12a. There can be a different pitch P3 for two adjacent outer ribs (see pitch P3 between ribs 16b and 12c in FIG. 4). There can be another pitch P4 between two similarly situated ribs in different groups 16, i.e. a pitch of one group 16a to another group 16b. The pitch P4 of one group to another group can be the same as, or substantially the same as, a pitch $P_r$ of initially patterned rib widths RW (see FIG. 11). Thus, although present technology may undesirably limit a pitch $P_r$ of one resist section 111 to another resist section 111, the present invention allows for multiple ribs 12 associated with each resist section 111, thus allowing for very fine pitches P1-3, which can allow for polarization of very small wavelengths of electromagnetic radiation. The pitch of one group 16a to another group 16b can be between 80 nanometers (nm) and 150 nm in one aspect or less than 150 nm in another aspect. The pitch of one group 16a to another group 16b can be greater than 150 nm for polarization of longer wavelengths of electromagnetic radiation. Having multiple pitches can allow tuning the polarizer to multiple wavelengths.

The pitch of the polarizer can depend on the width w of the ribs 12, the number of ribs 12 in a group 16, spacing d2 or d3 between the ribs, and a distance between outermost wires d1 of the groups 16. Thus, a width of the groups, i.e. a distance d1 between the outermost ribs 12 in each group 16, can be important for whether the polarizer can polarize a specified range of electromagnetic radiation. The distance d1 between the outermost ribs 12 in each group 16 can be less than 150 micrometers in one aspect, less than 1 micrometer in another aspect, less than 200 nanometers in another aspect, less than 100 nanometers in another aspect, or less than 60 nanometers in another aspect.

Figure 11:
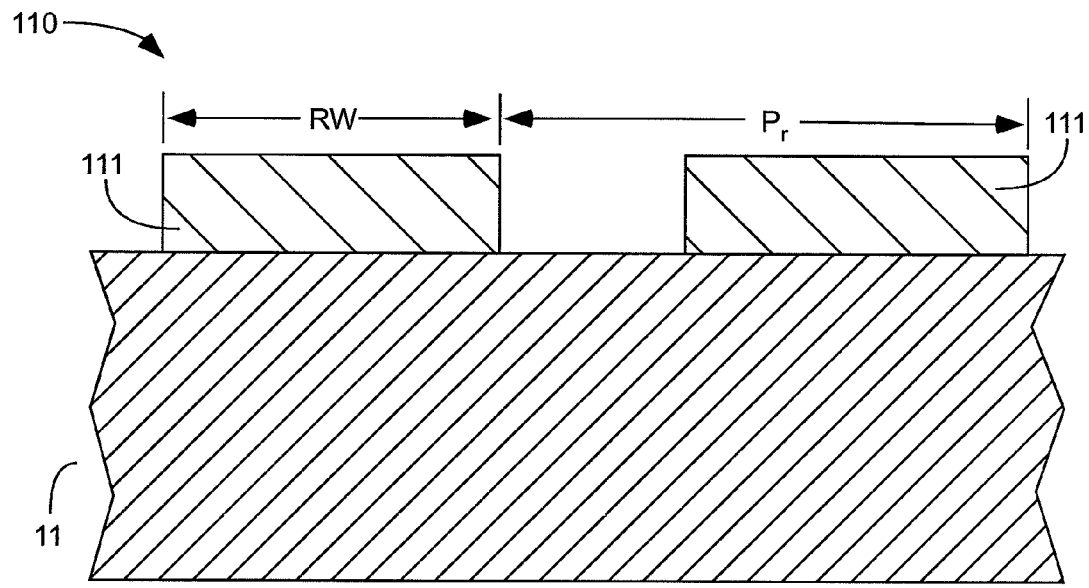
FIGS. 11-21 illustrate steps in manufacturing of grid polarizers according to various embodiments of the present invention.

As will be shown more fully in the how to make section, the distance d1 between the outermost ribs 16b in each group 16 can correspond to resist width RW (see FIG. 11). Resist width RW can be limited by available lithography techniques. Traditionally, resist width RW defined rib width. Some other methods have been proposed to move past this barrier, as were mentioned in the background section. The present invention is another way of allowing finer pitch of a polarizer in spite of resist width limitations imposed by present lithography techniques. The present invention can allow many ribs to be formed within a single resist width RW.

As mentioned above, the pitch can also depend on the width w of the ribs 12. Rib width w can be controlled by coating C width $w_c$ (see FIG. 15). Rib width w can be less than 100 nm in one aspect, less than 50 nm in another aspect, less than 30 nm in another aspect, or less than 15 nm in another aspect. Rib width w can be larger than these numbers, such as for polarization of infrared light.

As mentioned above, the pitch can also depend on spacing d2 between the ribs. Spacing or distance d2 between ribs within a group can be controlled by horizontal step length HL as will be described more fully in the how to make section, and by rib width w. A maximum distance d2 between any two ribs within the groups can be less than 100 nm in one aspect, less than 40 nm in another aspect, or less than 20 nm in another aspect. The maximum distance between any two ribs within the groups can be larger than these numbers, such as for polarization of infrared light. A maximum distance d2 is shown between the center ribs 12a in FIG. 1, but the maximum distance can be between any two adjacent ribs.

There can be different distances d between adjacent ribs, to allow tuning to different wavelengths. For example, as shown in FIG. 1, there may be one distance d2 between center ribs 12a and another distance d3 between a center rib 12a and an adjacent outer rib d3. If there are more than four ribs, then there may be a distance between any two adjacent outer ribs (see d4 in FIG. 4). A distance between one set of adjacent ribs compared to a distance between another set of adjacent ribs can be substantially the same in one aspect (e.g. |d2−d1|=0), can differ by at least 10 nm in another aspect (e.g. |d2−d1|>10 nm), can differ by at least 30 nm in another aspect (e.g. |d2−d1|>30), or can differ by at least 50 nm in another aspect (e.g. |d2−d1|>50). Having different distances between adjacent ribs can allow tuning the grid polarizer to multiple wavelengths and can allow for a smoother Ts curve.

The ribs 12 can include polarizing wires 13 disposed over substrate rods 14. The polarizing wires 13 can comprise a material or materials that can polarize incoming light, or effect polarization of light in combination with other materials, such as to absorb s-polarization or to improve transmission of p-polarization. The polarizing wires 13 can consist of a single layer of a single material, or can comprise multiple layers of different materials. Choice of material(s) can depend on the wavelength range of desired polarization. For example, germanium could be used for infrared light, aluminum for visible light, titanium oxide for ultraviolet light, or tantalum nitride, hafnium, or vanadium for x-rays.

Examples of materials that may be used for the polarizing wires 13, depending on the wavelength used, include without limitation: aluminum; aluminum oxide; aluminum silicate; antimony trioxide; antimony sulphide; beryllium oxide; bismuth oxide; bismuth triflouride; boron nitride; boron oxide; cadmium sulfide; cadmium telluride; calcium fluoride; ceric oxide; chiolite; cryolite; copper; cupric oxide; cupric chloride, cuprous chloride, cuprous sulfide; germanium; hafnium; hafnium dioxide; lanthanum fluoride; lanthanum oxide; lead chloride; lead fluoride; lead telluride; lithium fluoride; magnesium fluoride; magnesium oxide; neodymium fluoride; neodymium oxide; niobium oxide; praseodymium oxide; scandium oxide; silicon; silicon oxide; disilicon trioxide; silicon carbide; silicon dioxide; silicon nitride; silver; sodium fluoride; tantalum; tantalum oxide; tantalum pentoxide; tellurium; titanium; titanium oxide; titanium dioxide; titanium nitride, titanium carbide; thallous chloride; tungsten; vanadium; yttrium oxide; zinc selenide; zinc sulfide; zirconium dioxide, and combinations thereof.

One pair of polarizing wires can have one thickness and another pair of wires can have a different thickness, or all wires can have the same thickness. Thickness $Th_a$ of polarizing wires 13a of the two central ribs 12a can differ by at least 10 nanometers in one embodiment ($|Th_a-Th_b|>10$ nm), by at least 20 nanometers in another embodiment ($|Th_a-Th_b|>20$ nm), by at least 50 nanometers in another embodiment ($|Th_a-Th_b|>50$ nm), or between 10 nanometers and 200 nanometers in another embodiment (200 nm$>|Th_a-Th_b|>10$ nm), from a thickness $Th_b$ of polarizing wires 13b of two adjacent, outer ribs 13b. Having different thicknesses of wires can allow tuning the grid polarizer to multiple wavelengths and can allow for a smoother Ts curve.

Figure 2:
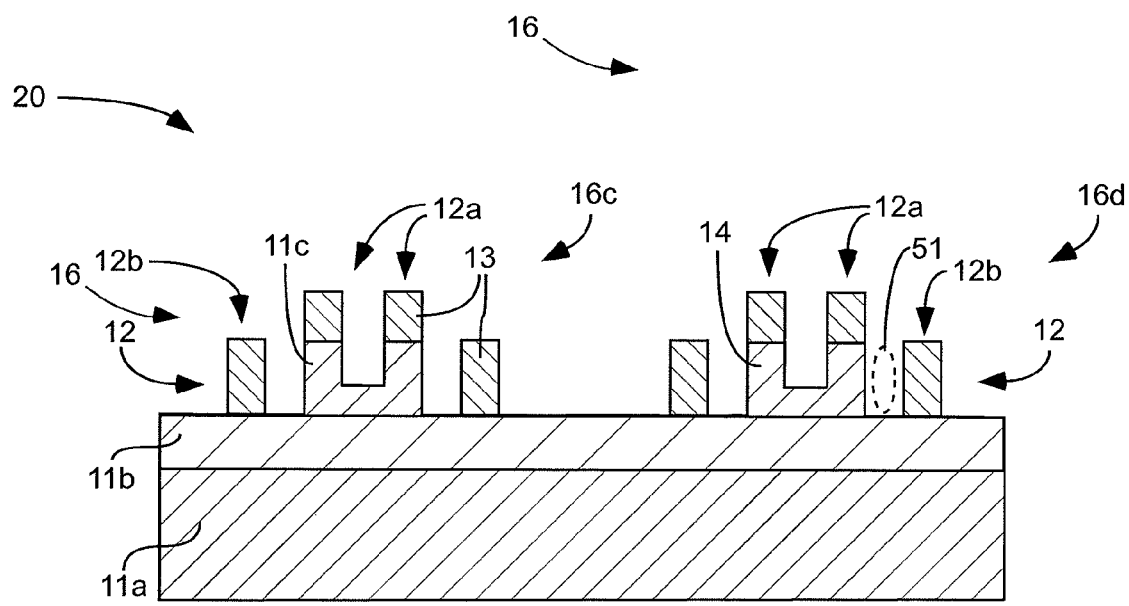
FIG. 2 is schematic cross-sectional side view of a grid polarizer 20 with groups 16c and 16d of elongated ribs 12 having four ribs 12 in each group 16c and 16d, a pair of center ribs 12a comprising polarizing wires 13 disposed over substrate rods 14, and two outermost ribs 16b in each group comprising polarizing wires 13 not disposed over substrate rods, in accordance with an embodiment of the present invention.

The substrate 11 can be transparent to incoming light. The substrate 11 can comprise a single layer of a single material, or multiple layers of different materials. Shown on grid polarizer 20 of FIG. 2 is a substrate with three layers 11a-c. The lower layer 11a and the upper layer 11c can be the same or can be different. The middle layer 11b can be a different material from the upper layer 11c and can comprise a material that is resistant to an etch of the upper layer. For example, the upper layer 11c could be made of silicon dioxide and the middle layer could be made of silicon nitride, then an oxide etch could be used. Thus, by proper selection of the etch of upper substrate layer 11c, the upper layer 11c can etch without etching the middle layer 11b, which can result in inner ribs of each group comprising polarizing wires 13 disposed over substrate rods 14 and two outermost ribs comprising polarizing wires 13 not disposed over substrate rods 14. In FIG. 2, there are two inner ribs (the center ribs 12a), but there may be more inner ribs. Alternatively, as was shown on polarizer 10 of FIG. 1, all ribs 12 can comprise polarizing wires 13 disposed over substrate rods 14. This may be accomplished by etching the substrate 11 between all polarizing wires 13, and may be dependent on whether the substrate 11 is a single material or layers of multiple materials, types of materials of the different layers (if multiple layers are used), and on the type of etch used.

In contrast to the polarizer 10 of FIG. 1, in which the substrate etch continues down to a base of the wires 13a and 13b on both an inner side 9a and an outer side 9b of the wires, on grid polarizer 30 of FIG. 3 the substrate etch can remove substrate 11 from an outer side of the base 9b of the polarizing wire 13 but not from an inner side of the base 9a, thus leaving a portion of the substrate 11d between adjacent polarizing wires 13 and on sides of polarizing wires 13. In other words, the etch of polarizer 10 of FIG. 1 is deeper than the etch of polarizer 30 of FIG. 3. Desired depth of etch can be dependent on effect on polarization, polarizer durability, and manufacturing considerations for the specific polarizer design.

Figure 4:
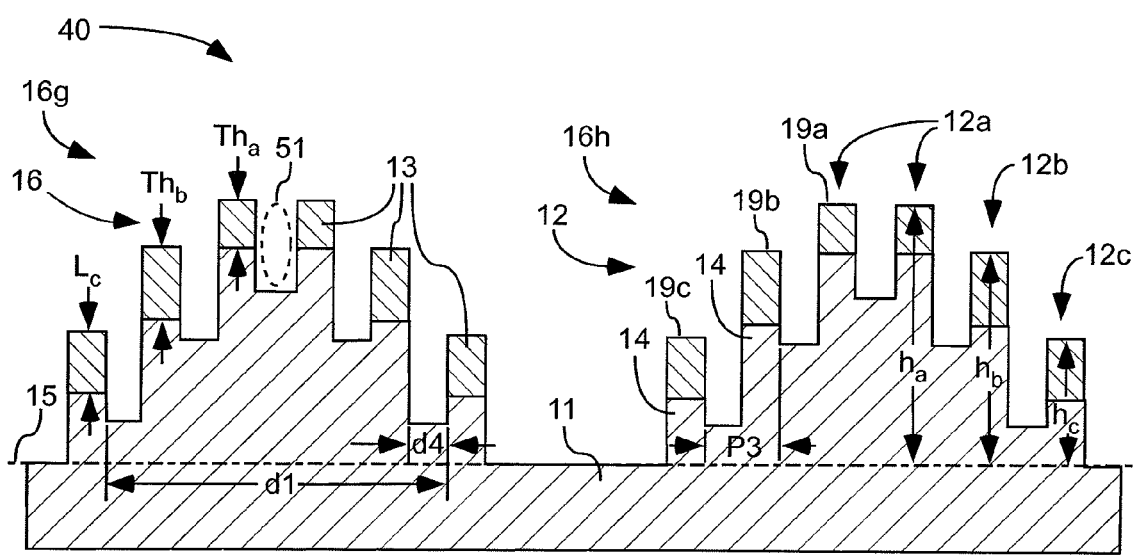
FIG. 4 is schematic cross-sectional side view of a grid polarizer 40 with groups 16g and 16h of elongated ribs 12 having six ribs 12 in each group 16g and 16h, the ribs 12 comprising polarizing wires 13 disposed over substrate rods 14, in accordance with an embodiment of the present invention.
Figure 5:
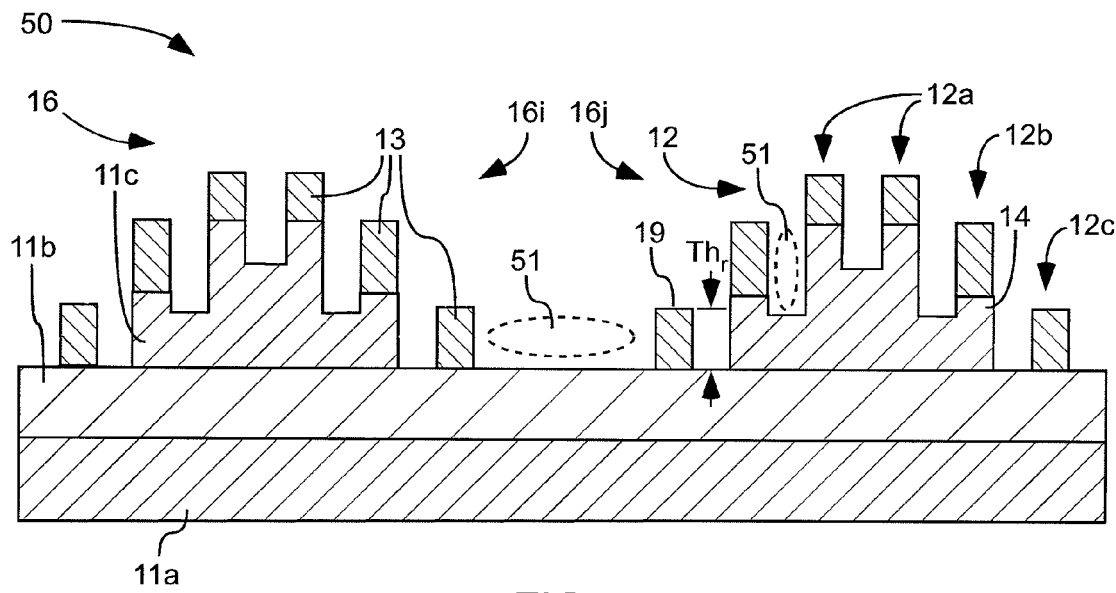
FIG. 5 is schematic cross-sectional side view of a grid polarizer 50 with groups 16i and 16j of elongated ribs 12 having six ribs 12 in each group 16i and 16j, four innermost ribs 12a and 16b comprising polarizing wires 13 disposed over substrate rods 14, and two outermost ribs 12c in each group comprising polarizing wires 13 not disposed over substrate rods, in accordance with an embodiment of the present invention.

Shown in FIGS. 4-5 are grid polarizers 40 and 50 with six ribs 12a-c in each group 16. Grid polarizers in the present invention can also have more than six ribs in each group 16. The above discussion regarding the four rib groups is applicable with regard to six or more ribs in a group, and is incorporated herein by reference.

The ribs in polarizers 40 and 50 can be arranged in stepped pyramidal cross-sectional shape. Each rib 12 can be paired with another rib 12 of substantially the same elevational height h on an opposite side of the stepped pyramidal cross-sectional shape. A top of each interior rib can be higher than a top of an adjacent outer rib. For example, the top 19a of center rib 12a can be higher than the top 19b of middle rib 12b, and the top 19b of middle rib 16b can be higher than the top 19c of outer rib 12c (rib 12a is interior to rib 16b and rib 16b is interior to rib 12c). The top of each interior rib can be higher than a top of an adjacent outer rib by at least 10 nm in one aspect (e.g. $h_a-h_b>10$ nm and $h_b-h_c>10$ nm), by at least 30 nm in another aspect (e.g. $h_a-h_b>30$ nm and $h_b-h_c>30$ nm), by at least 50 nm in another aspect (e.g. $h_a-h_b>50$ nm and $h_b-h_c>50$ nm), or between at 10 nm and 200 nm in another aspect (e.g. 200 nm$>h_a-h_b>10$ nm and 200 nm$>h_b-h_c>10$ nm).

As shown in FIG. 4, all ribs 12 comprise polarizing wires 13 disposed over substrate rods 14. As shown in FIG. 5, the four innermost ribs 12a and 16b of each group 16i and 16j can comprise polarizing wires 13 disposed over substrate rods 14 and two outermost ribs 12c can comprise polarizing wires 13 not disposed over substrate rods 14. There may be more than four innermost ribs, but this is not shown in the figures. The polarizer 50 of FIG. 5 may be made similar to the polarizer 20 of FIG. 2, as was described above, by use of a multi-layer substrate 11a-c, and by use of a selective etch.

Figure 6:
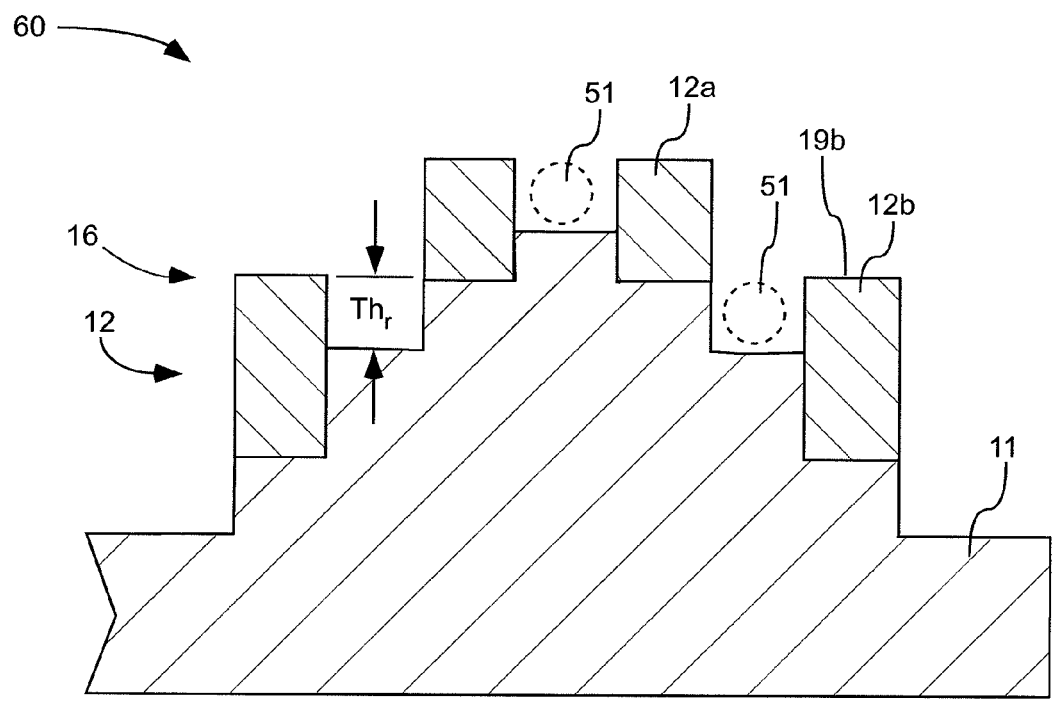
FIG. 6 is schematic cross-sectional side view of a grid polarizer 60 showing a single group of elongated ribs 12 with a region 51 between adjacent ribs having an index of refraction substantially equal to one, in accordance with an embodiment of the present invention.

Shown in FIGS. 1-8, there is a region 51 between adjacent ribs which can have an index of refraction n substantially equal to one. Air has an index of refraction n that is substantially equal to one. The region 51 can extend from a top of the rib to the substrate. As shown in FIG. 6, the region 51 can extend from a top of a lowest of two adjacent ribs (e.g. from the top 19b of rib 12b, which is lower than rib 12a) towards the substrate (between the two adjacent ribs, such as between rib 12a and 12b) for a region thickness $Th_r$ of at least 10 nanometers in one aspect ($Th_r>10$ nm), a region thickness $Th_r$ of at least 30 nanometers in another aspect ($Th_r>30$ nm), a region thickness $Th_r$ of at least 50 nanometers in another aspect ($Th_r>50$ nm), a region thickness $Th_r$ of between 10 nanometers and 300 nanometers in another aspect (300 nm$>Th_r>10$ nm), or a region thickness $Th_r$ of between 0.25 micrometers and 3 micrometers in another aspect (0.25 µm$>Th_r>3$ µm).

Figure 7:
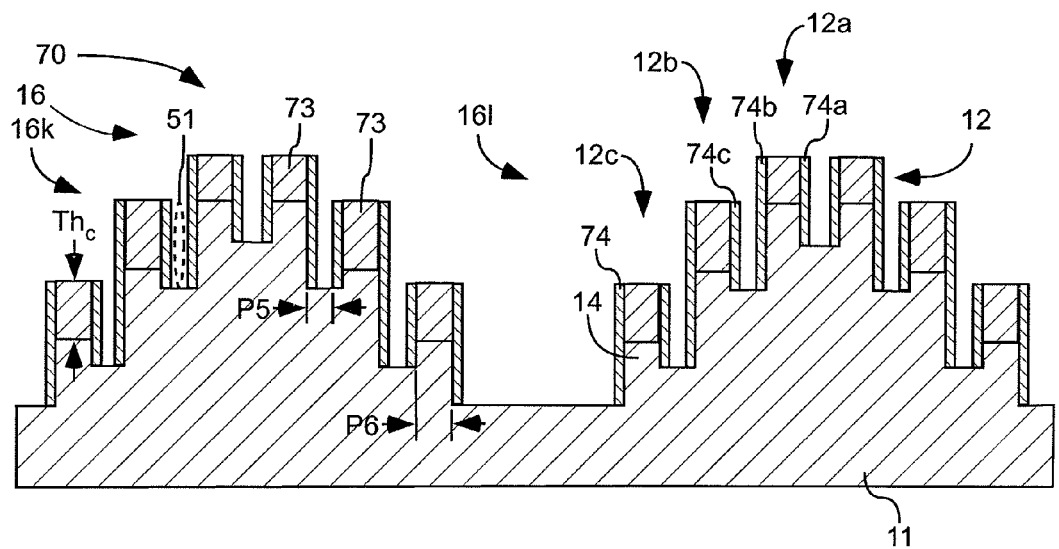
FIG. 7 is schematic cross-sectional side view of a grid polarizer 70 with groups 16k and 16l of elongated ribs 12 having six ribs 12 in each group 16k and 16l, the ribs comprising polarizing bars 74 disposed on opposite sides of a central, transparent core 73, in accordance with an embodiment of the present invention.

As shown in FIG. 7, a polarizing material (polarizing bars) 74 can be disposed on sides of the ribs 12. Polarizing bars 74 can be made of a material that can polarize the desired wavelengths, and thus polarizing bars 74 can be made of the same materials as described above for polarizing wires 13. The ribs 12 can comprise a central, transparent core 73 that is transparent to incoming light, for separation of the polarizing bars 74. Thus, the ribs 12 can comprise polarizing bars 74 disposed on opposite sides of a central, transparent core 73. The central, transparent core 73 of different ribs 12 can all be a single material, or the central, transparent core 73 of upper rib(s) 12a and 16b can be made of one material, and the central, transparent core 73 of lowest ribs 12c can be made of a different transparent material, such as an etch redeposition material. The overall structure of the ribs 12 can be similar to any of the embodiments described above, with the exception of a different core 73 material (i.e. a transparent core 73 rather than polarizing wires 13).

Each polarizing bar 74 on one side can be physically separate from a polarizing bar 74 on an opposite side. A polarizing bar 74a on one side can be separated from a polarizing bar 74b on an opposite side of a rib 12a by a transparent rib core 73, i.e. polarizing bar material does not extend over the top of the rib, connecting a bar 74a on one side to a bar 74b on an opposite side. Each polarizing bar 74 can be physically separate from a polarizing bar 74 on an adjacent rib. For example, polarizing bar 74b on center rib 12a can be physically separate from a polarizing bar 74c on an adjacent outer rib 12b, i.e. polarizing bar material does not extend across the substrate between adjacent polarizing bars. The grid polarizer 70 of FIG. 7 can have a pitch P5-6 that is half of the pitch P1-2 of adjacent ribs on a similar polarizer structure without the polarizing bars 74 on the sides. This smaller pitch can allow for polarization of smaller wavelengths of electromagnetic radiation. The pitch P5 between one set of adjacent bars 74 can be different from the pitch P6 between a different set of adjacent bars 74, thus allowing for tuning to multiple wavelengths.

Figure 8:
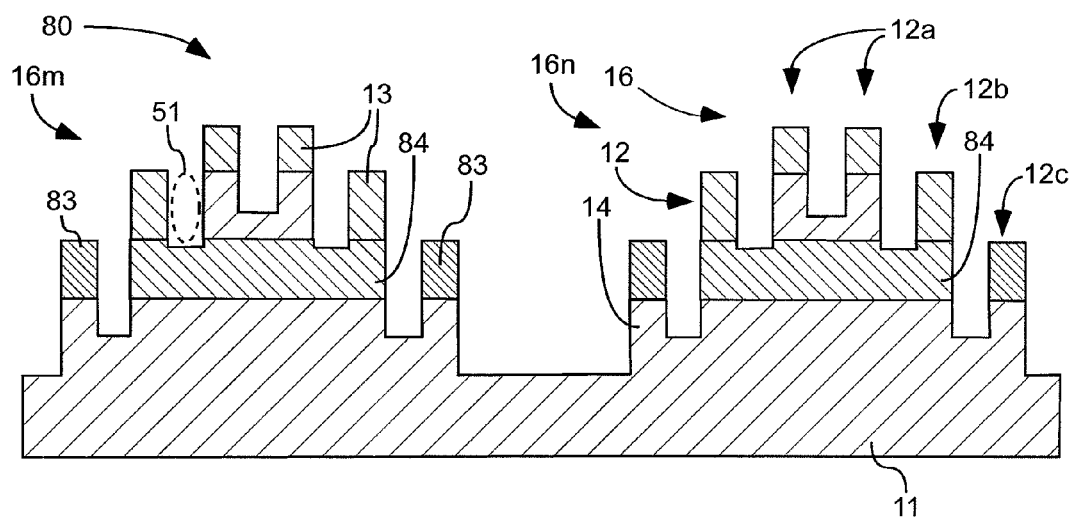
FIG. 8 is schematic cross-sectional side view of a grid polarizer 80 with groups 16m and 16n of elongated ribs 12 having six ribs 12 in each group 16m and 16n with two outermost ribs 12c in each group 16 comprising a material different than a material of inner ribs 12a and 12b, and two outermost ribs 12c comprising an etch redeposition material, in accordance with an embodiment of the present invention.

As shown on grid polarizer 80 of FIG. 8, outermost ribs 12c of each group 16m and 16n can comprise a material 83 that is different than a material of inner ribs 12a and 12b. Outermost ribs 12c can comprise an etch redeposition material. Use of a different rib material for outer ribs 12c compared to inner ribs 12a and 16b can allow for improved tuning of the grid polarizer 80 by designing a different polarizing material for different wavelengths or different wavelength bands. Shown in FIG. 8 are four inner ribs 12a-b, but there may be two inner ribs or there may be more than four ribs.

How to Make

Figure 9:
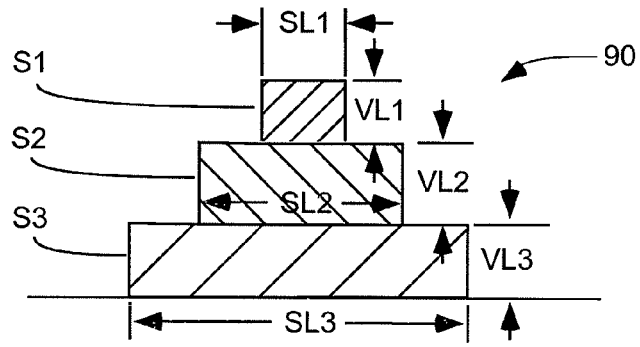
FIGS. 9-10 are schematic cross-sectional side views of ribbons 90 with dimensions defined, in accordance with embodiments of the present invention.
Figure 10:
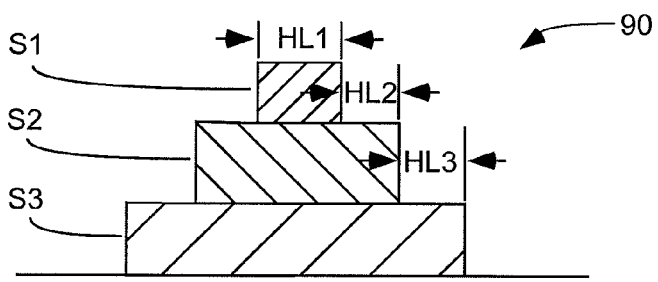

FIGS. 9-21 will be used to show how to make the previously described grid polarizers. FIGS. 9-10 show multi-stepped pyramidal cross-sectional shaped ribbons 90 that can be used in formation of ribs 12 in the grid polarizers described herein. Although three step ribbons 90 with three steps S1-3 are shown in FIGS. 9-10, the ribbons 90 can have only two steps, or more than three steps.

Vertical length VL1-3 and step length SL1-3 of the steps S1-3 are shown in FIG. 9. In one embodiment, a vertical length of one step can be the same as a vertical length of another step, or all other steps. In another embodiment, a vertical length of one step can be different from a vertical length of another step, or all other steps. For example, the steps S1-3 can have substantially equal vertical lengths, VL1=VL2=VL3. Alternatively, the steps S1-3 can have unequal vertical lengths, VL1≠VL2≠VL3. Use of different vertical lengths of vertical surfaces on different steps can result in formation of a polarizer having polarizing wires 13 or polarizing bars 74 of different heights. Each polarizing wire 13 or polarizing bar 74 height can be tuned for optimal polarization of a wavelength of interest. A difference of vertical length of one step compared to any other step can be more than 10 nanometers in one aspect, 10 to 50 nanometers in another aspect, 50 to 100 nanometers in another aspect, or 100-200 nanometers in another aspect.

Horizontal length HL1-3 of steps S1-3 are shown in FIG. 10. The horizontal length of all steps can be approximately the same (HL1=HL2=HL3). The horizontal length of a step may be different from the horizontal length of one or more other steps (HL1≠HL2 or HL1≠HL2 or HL1≠HL2≠HL3). Horizontal length will affect distance between later formed polarizing structures. The horizontal length of steps may be adjusted in order to optimize polarization of desired wavelengths.

Figure 12:
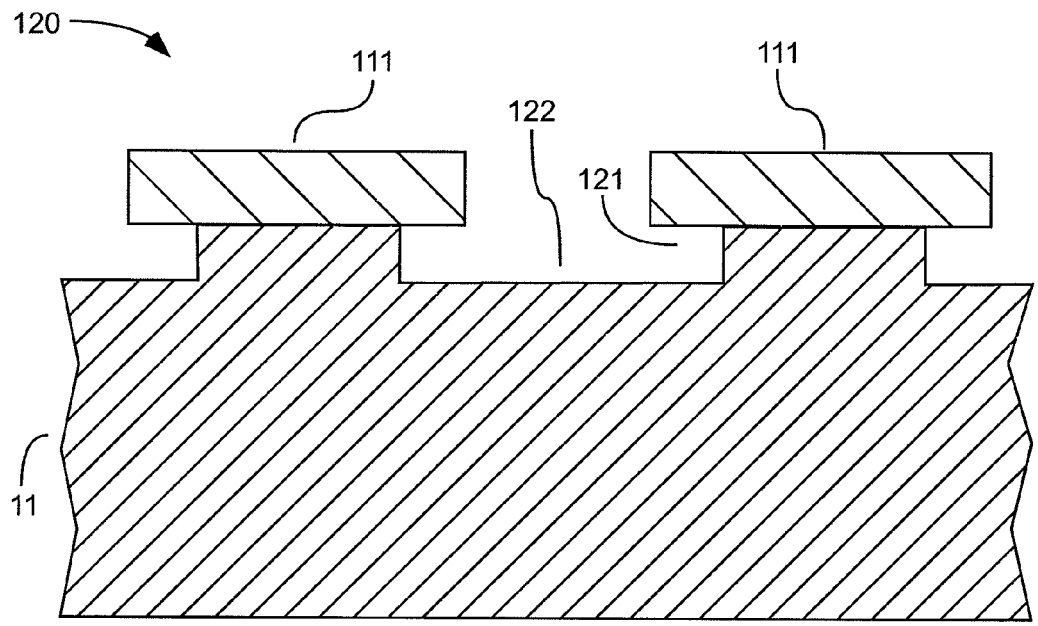
Figure 13:
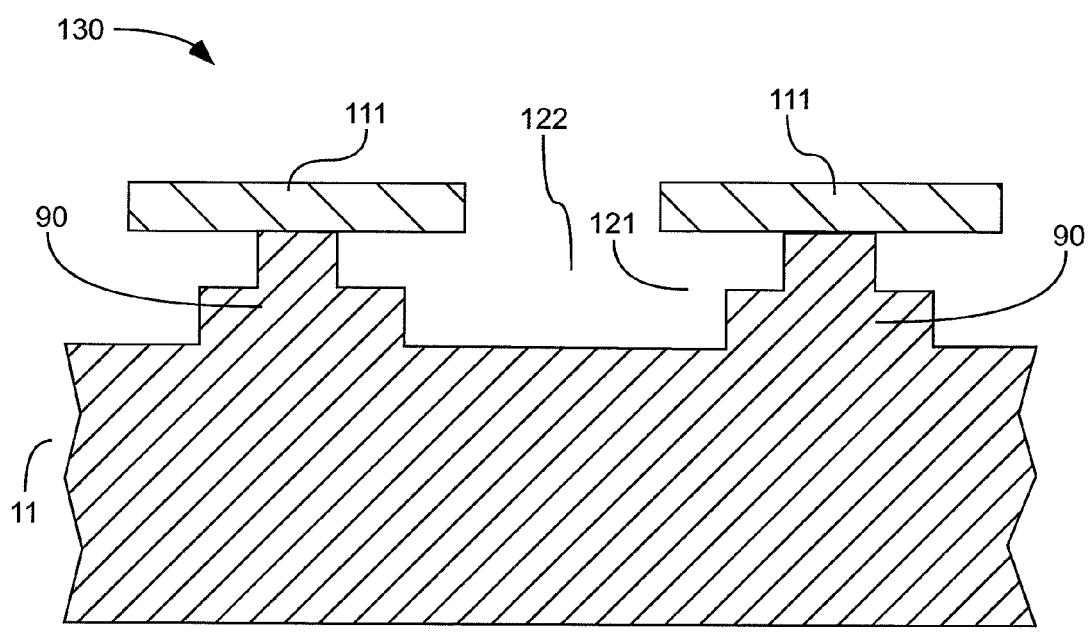

FIGS. 11-14 show one method for formation of multi-step ribbons 90 in a substrate. As shown in FIG. 11, a resist may be applied to a substrate 11. The resist can be patterned to form separate resist sections 111, the resist sections 111 having resist widths RW. Each resist width RW can correspond approximately to a width of a group 16 of ribs 12, that will be formed in subsequent steps. As shown in FIG. 12, a first isotropic etch can etch both vertically 122 into the substrate 11 outside the resist and horizontally 121 under the resist 111. As shown in FIG. 13, at least one additional isotropic etch, that is less isotropic than the previous isotropic etch, may be performed to etch both vertically 122 into the substrate laterally outside the resist 111 and horizontally 121 under the resist 111. By use of a second etch that is less isotropic than the first, an additional step can be formed. Each successive etch that that is less isotropic than the previous etch can result in formation of an additional step. These successive isotropic etches, with different isotropic characteristics, can form multi-step ribbons 90.

Step horizontal length HL and step vertical length VL can be controlled during step formation by the nature of the isotropic etches performed. A more isotropic etch can create a longer horizontal length HL for a step. A longer horizontal step can result in a larger distance d2 or d3 between adjacent ribs 12. A longer etch time can create a longer vertical step length VL, which can result in larger wire 13 thickness $Th_a$ or $Th_b$ or central, transparent core 73 thickness $Th_c$.

Figure 14:
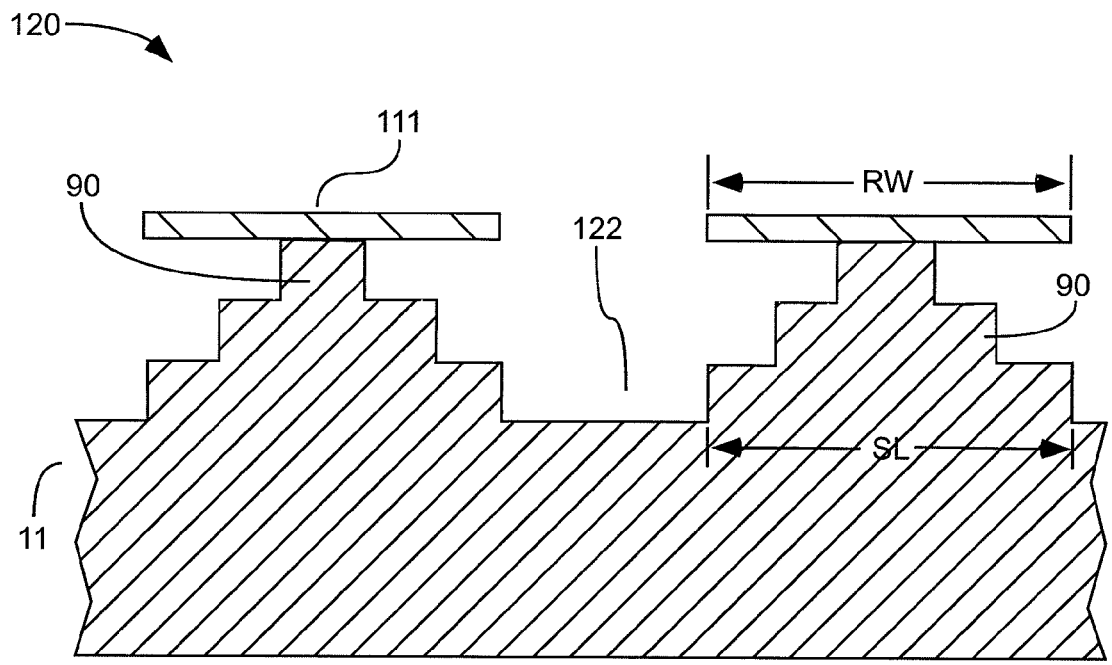

As shown in FIG. 14, an anisotropic etch can etch vertically 122 into the substrate 11 laterally outside the resist 111 and can remove the resist 111. The anisotropic etch can be used to create a lowest step having a step length SL that is about the same as the width of the resist RW. A longer anisotropic etch time can create a longer vertical step length VL of the lowest step, which can result in larger wire 13 thickness $Th_a$ or $Th_b$ or central, transparent core 73 thickness $Th_c$. Based on the nature and length of the different isotropic etches and the anisotropic etch, the steps S can have the same or different dimensions HL and VL with respect to each other. Thus, by use of two isotropic etches, with the second less isotropic than the first, followed by an anisotropic etch, a three step structure 120 can be formed. Additional isotropic etches, each subsequent isotropic etch less isotropic than the previous, followed by an anisotropic etch, can result in formation of a structure with more than three steps. Alternative methods for forming ribbons 90 include depositing a ribbon material on a primary substrate 11 or ion milling into the substrate 11.

Figure 15:
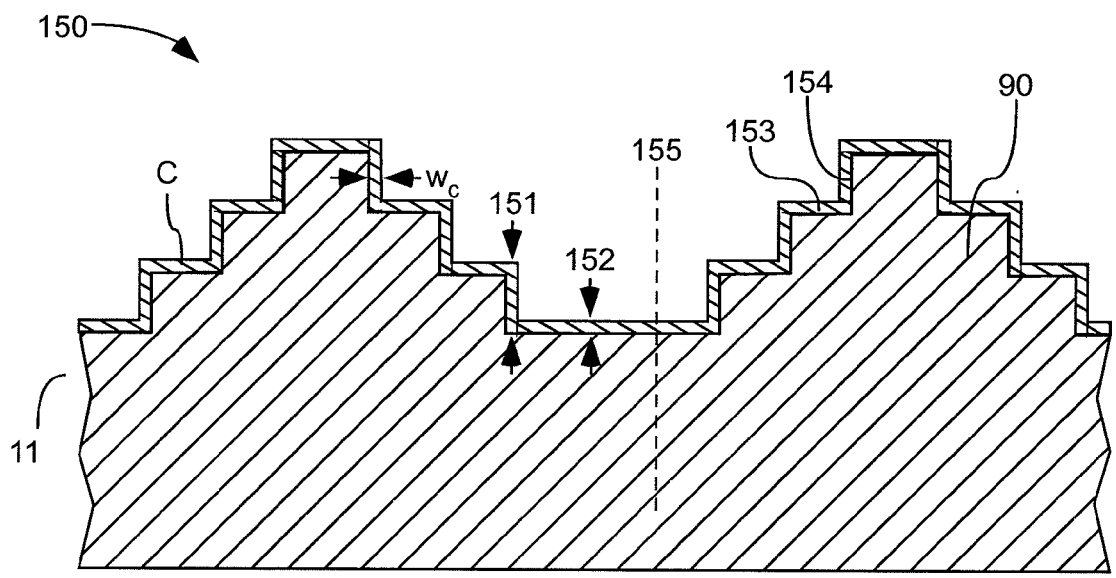

After the ribbons 90 have been created, the surface of the structure may be coated with a coating C, as shown in FIG. 15. The coating can be a single layer of a single material or can be multiple layers and each layer can be a different material from one or all other layers. The coating C may be conformal, non-conformal, segmented, atomic layer deposition, spin on, or etch redeposition. The coating C can then be anisotropically etched to substantially remove the coating C from horizontal surfaces 153 while leaving a majority of the coating C on vertical surfaces 154. The coating can be removed from horizontal surfaces 153 in the anisotropic etch, while leaving a substantial portion of the coating on the vertical surfaces 154, because a thickness 152 of the coating C on the horizontal surfaces 153, in a direction perpendicular 155 to a main plane of the substrate, can be less than a thickness 151 of the coating C on the vertical surfaces 154, along this same direction 155.

Figure 16:
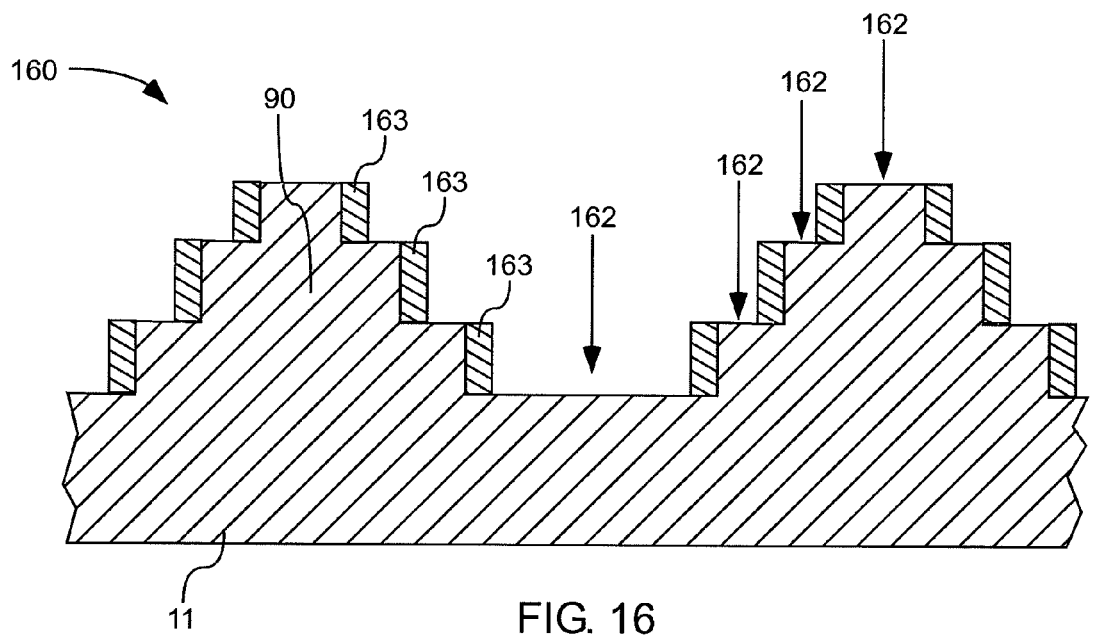

As shown in FIG. 16, strips 163 remaining on vertical surfaces, can be polarizing wires 13; or the strips 163 can be a central, transparent core 73, for separation of polarizing bars 74. An anisotropic etch 162 can preferentially etch substrate ribbons 90 between strips 163 to form separate ribs 12. An etch can be selected that will preferentially etch substrate ribbons 90 with minimal affect on the strips 163.

Figure 17:
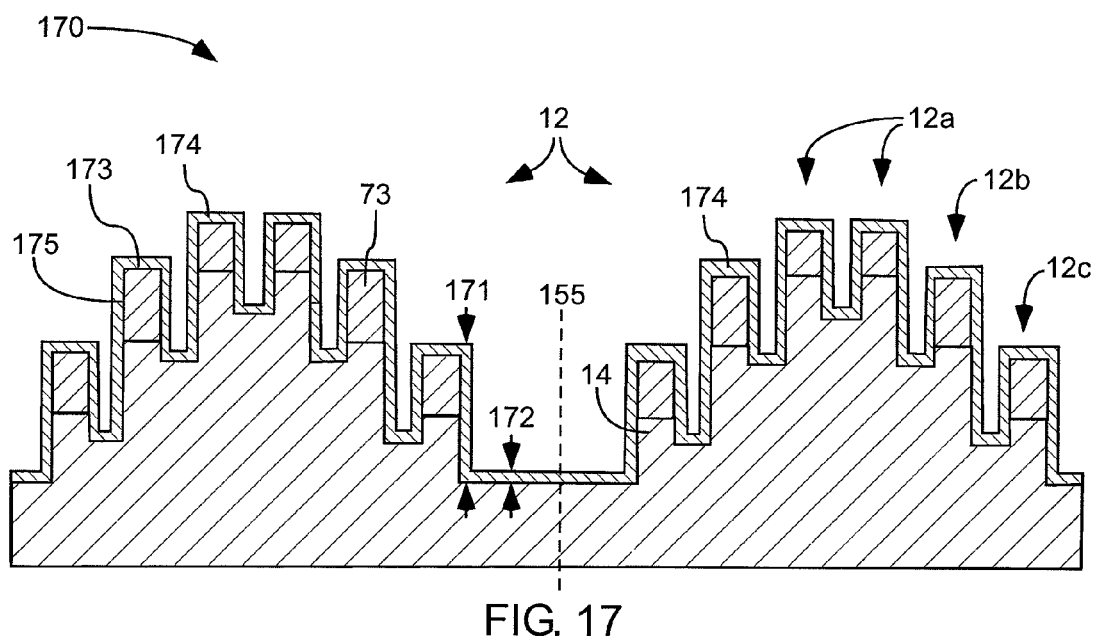
Figure 18:
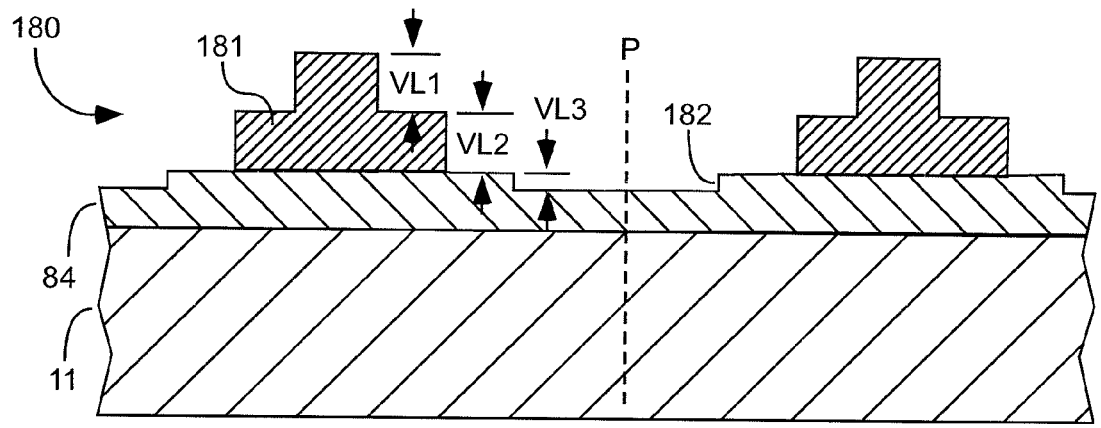

FIG. 17 shows one step 170 in manufacture of the grid polarizer 70 of FIG. 7. A structure can first be formed, similar to those of FIGS. 1-5 or FIG. 8, with the exception that a central, transparent core 73 can be used instead of polarizing bars 13. A second coating 174 can be formed over a surface of the ribs, such as by atomic layer deposition for example. An anisotropic etch can form separate polarizing bars 74 on sides of the ribs 12. The second coating 174 can be removed from horizontal surfaces 173 in the anisotropic etch, while leaving a substantial portion of the coating 174 on the vertical surfaces 175, because a thickness 172 of the coating 174 on the horizontal surfaces 173, in a direction perpendicular 155 to a main plane of the substrate, is less than a thickness 171 of the coating 174 on the vertical surfaces 175, along this same direction 155.

FIGS. 18-21 illustrate a manufacturing process of the grid polarizer 80 of FIG. 8. As shown on the structure 180 in FIG. 18, steps 181 and 182 can be formed as described above. Upper step(s) 181 can have a vertical length VL that is substantially greater than a vertical length VL of the lowest step 182 (VL1>VL3 and VL2>VL3). The substrate 11, the lowest step 182, and the upper step 181 can be formed of the same material, if suitable etch deposition ribs 83 can be formed with this material. Alternatively, the substrate 11 can be made of one material and the lowest step 182 can be formed of a different material 84 (lowest step material). The upper step 182 may or may not be the same material as the substrate 11.

Figure 19:
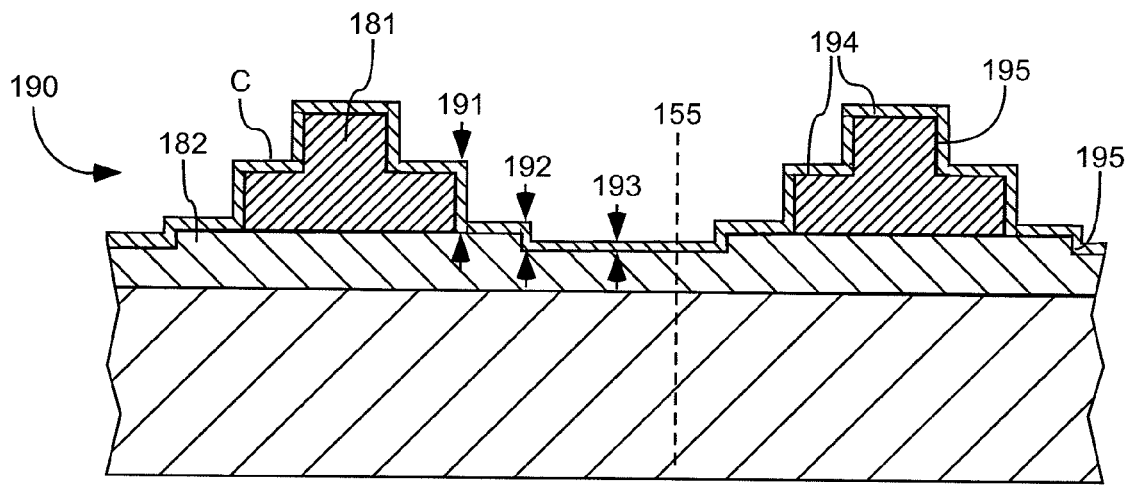

After the steps 181 and 182 have been created, the surface of the structure may be coated with a coating C, as shown in FIG. 19. The coating can be a single layer of a single material or can be multiple layers and each layer can be a different material from one or all other layers. The coating C may be conformal, non-conformal, segmented, atomic layer deposition, or spin on. The coating C can be a material that can be used for polarization, or can be a transparent material used for separation of polarizing bars 74.

Figure 20:
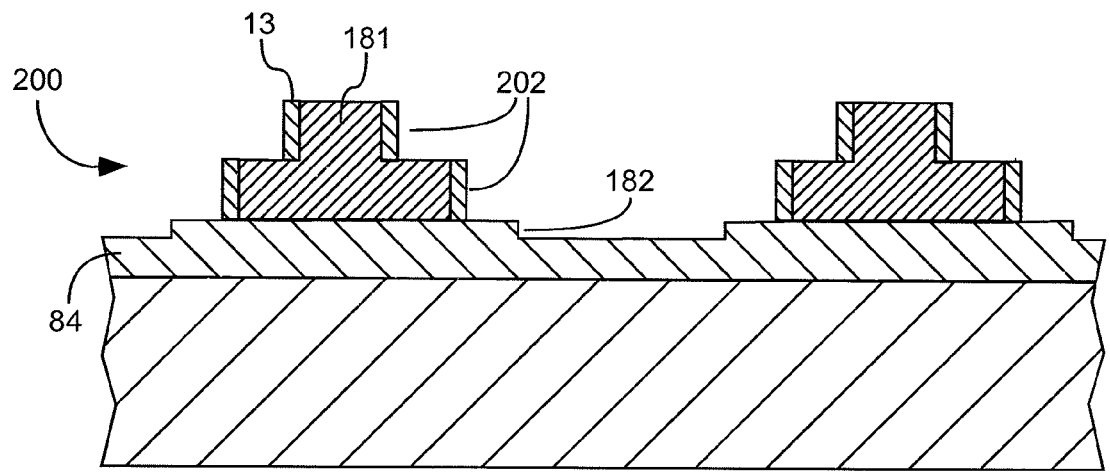

The coating C can then be anisotropically etched to substantially remove the coating C from horizontal surfaces 194 and from vertical surfaces 195 of the lower step 182 while leaving a majority of the coating C on vertical surfaces 195 of the upper step(s) 181, forming coating ribs 202, as shown on structure 200 in FIG. 20. The coating ribs 202 can be a material that can be used for polarization, or can be a transparent material used for separation of polarizing bars 74. The coating C can be removed from horizontal surfaces 194 and from vertical surfaces 195 of the lower step 182 in the anisotropic etch, while leaving a substantial portion of the coating on the vertical surfaces 195 of the upper step(s) 181, because a thickness 193 of the coating C on the horizontal surfaces 194 and a thickness 192 of the coating C on the vertical surfaces 195 of the lower step 182, in a direction perpendicular 155 to a main plane of the substrate, is less than a thickness 191 of the coating C on the vertical surfaces 195 of the upper step(s), along this same direction 155.

Figure 21:
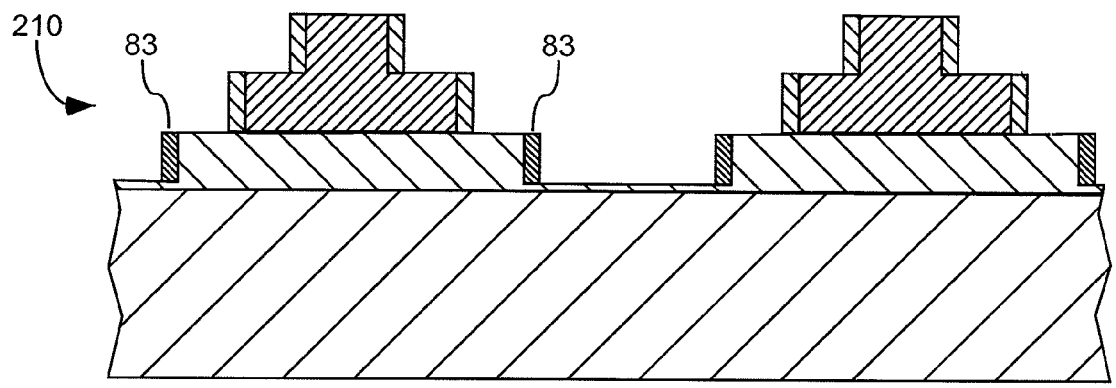

As shown on structure 210 in FIG. 21, an anisotropic etch, optimized for etch redeposition, can allow formation of etch redeposition ribs 83 at the lower step 182 vertical surfaces. Further anisotropic etching can etch upper step material between the upper step 181 coating ribs 202 and can etch the lowest step layer 182 between etch redeposition ribs 83 to form the structure shown in FIG. 8. The anisotropic etch for removal of coating C on horizontal surfaces 194 and from vertical surfaces 195 of the lowest step 182, and the anisotropic etch for formation of etch redeposition ribs, can be the same etch, or two separate etches. The lowest step material 84 can be a material that will, when redeposited with etch chemistry, will form suitable polarizing ribs. For example, the lowest step material 84 can comprise a metal, or silicon nitride.

What is claimed is:

1. A grid polarizer, comprising:
   an array of groups of parallel elongated ribs disposed over a substrate, each group of elongated ribs including at least four ribs;
   a region between adjacent ribs in each group having an index of refraction substantially equal to one; and
   tops of two inner ribs of each group are substantially the same elevational height and are higher by more than 10 nm than tops of outer ribs of the respective group.

2. The grid polarizer of claim 1, wherein:
   each group of elongated ribs comprises at least six ribs and the ribs are arranged in stepped pyramidal cross-sectional shape such that a top of each interior rib is at least 10 nm higher than a top of an adjacent outer rib; and
   each rib is paired with another rib of substantially the same elevational height on an opposite side of the pyramidal cross-sectional shape.

3. The grid polarizer of claim 2, wherein four innermost ribs of each group comprise polarizing wires disposed over substrate rods and two outermost ribs comprise polarizing wires not disposed over substrate rods.

4. The grid polarizer of claim 1, wherein a thickness of polarizing wires of the two inner ribs differs by at least 10 nanometers from a thickness of polarizing wires of two adjacent, outer ribs.

5. The grid polarizer of claim 1, wherein:
   outermost ribs of each group comprise a material different than a material of inner ribs; and
   the outermost ribs comprise an etch redeposition material.

6. The grid polarizer of claim 1, wherein all ribs comprise polarizing wires disposed over substrate rods.

7. The grid polarizer of claim 1, wherein a distance between the outermost ribs in each group is less than 200 nanometers.

8. The grid polarizer of claim 1, wherein a maximum distance between any two adjacent ribs in the groups is less than 40 nm.

9. The grid polarizer of claim 1, wherein interior ribs of the groups are at least 30 nm higher than adjacent outer ribs.

10. The grid polarizer of claim 1, wherein the ribs comprise:
    polarizing bars disposed on opposite sides of a central, transparent, core;
    each polarizing bar on one side is physically separate from a polarizing bar on an opposite side; and
    each polarizing bar is physically separate from a polarizing bar on an adjacent rib.

11. The grid polarizer of claim 1, wherein the region between adjacent ribs extends from a top of a lowest of the two adjacent ribs towards the substrate for a thickness of at least 30 nanometers.

12. The grid polarizer of claim 1, wherein a pitch of one group to another group is between 80 nanometers and 150 nanometers.

13. A grid polarizer, comprising:
    an array of groups of parallel elongated ribs disposed over a substrate;
    each group of elongated ribs comprises at least six ribs;
    two inner ribs of each group are substantially the same elevational height;
    at least four interior ribs comprise polarizing wires disposed over substrate rods;
    the ribs are arranged in stepped pyramidal cross-sectional shape such that tops of the two inner ribs are highest, and tops of each outer rib is lower, by at least 20 nm, than an adjacent interior rib;
    each rib is paired with another rib of substantially the same elevational height on an opposite side of the pyramidal cross-sectional shape; and
    a distance between the outermost ribs in each group is less than 200 nanometers.

14. The grid polarizer of claim 13, wherein
    the outermost ribs of each group comprise a material different than a material of inner ribs; and
    the outermost ribs comprise an etch redeposition material.

* * * * *